(12) United States Patent
Alasaarela et al.

(10) Patent No.: US 7,729,578 B2
(45) Date of Patent: Jun. 1, 2010

(54) ILLUMINATOR METHOD AND DEVICE

(75) Inventors: Ilkka A. Alasaarela, Liminka (FI); Jussi P. Soukkamäki, Oulu (FI); Teuvo K. Viljamaa, Oulu (FI)

(73) Assignee: Upstream Engineering Oy, Oulu (FI)

( * ) Notice: Subject to any disclaimer, the term of this patent is extended or adjusted under 35 U.S.C. 154(b) by 434 days.

(21) Appl. No.: 11/891,362

(22) Filed: Aug. 10, 2007

(65) Prior Publication Data
US 2008/0037116 A1 Feb. 14, 2008

Related U.S. Application Data

(63) Continuation of application No. 11/407,829, filed on Apr. 18, 2006, now Pat. No. 7,270,428.

(60) Provisional application No. 60/837,071, filed on Aug. 10, 2006.

(51) Int. Cl.
*G02B 6/42* (2006.01)
*F21V 1/00* (2006.01)
*G02B 3/06* (2006.01)
*G02B 3/00* (2006.01)

(52) U.S. Cl. .......................... 385/33; 385/31; 385/88; 385/92; 385/93; 362/509; 362/511; 362/309; 359/433; 359/642; 359/711

(58) Field of Classification Search ........... 385/31, 385/33, 34, 88, 89, 92, 93, 94, 146; 362/555, 362/551, 509, 510, 511, 310, 308, 309; 359/362, 359/366, 385, 433, 642, 711
See application file for complete search history.

(56) References Cited

U.S. PATENT DOCUMENTS 2,224,178 A 5/1940 Bitner ..................... 240/106.1

(Continued)

FOREIGN PATENT DOCUMENTS

EP 080 7832 A2 11/1997

(Continued)

OTHER PUBLICATIONS

Glassner, A. S., "An Introduction To Ray Tracing" Chapter 3, pp. 79-119 (A Survey of Ray-Surface Intersection Algorithms), Morgan Kaufmann Publishers, 9th edition, 2002.

(Continued)

*Primary Examiner*—Brian M Healy
(74) *Attorney, Agent, or Firm*—Harrington & Smith

(57) ABSTRACT

A first toroidal ray guide defines an axis of revolution and has a toroidal entrance pupil adapted to image light incident on the entrance pupil at an angle to the axis of revolution between 40 and 140 degrees, and it also has a first imaging surface opposite the entrance pupil. A second toroidal ray guide also defines the same axis of revolution and has a second imaging surface adjacent to the first imaging surface. Various additions and further qualities of the ray guides, which form optical channels, are disclosed. In a method light emanating from a source at between 40-140 degrees from an optical axis is received at an entrance pupil of a ray guide arrangement that is circularly symmetric about the optical axis. Then the received light is redirected through the ray guide arrangement to an exit pupil in an average direction substantially parallel to the optical axis.

31 Claims, 29 Drawing Sheets

U.S. PATENT DOCUMENTS

| | | | | |
|---|---|---|---|---|
| 2,254,962 | A | 9/1941 | Harris et al. | 240/106.1 |
| 3,834,789 | A | 9/1974 | Brudy | 350/97 |
| 5,008,496 | A | 4/1991 | Schmidt et al. | 174/254 |
| 5,121,983 | A | 6/1992 | Lee | 353/8 |
| 5,398,086 | A | 3/1995 | Nakano et al. | 353/31 |
| 5,825,741 | A | 10/1998 | Welch et al. | 369/112 |
| 5,971,545 | A | 10/1999 | Haitz | 353/31 |
| 6,021,106 | A | 2/2000 | Welch et al. | 369/112 |
| 6,155,699 | A | 12/2000 | Miller et al. | 362/293 |
| 6,407,868 | B1 | 6/2002 | Ishibashi et al. | 359/634 |
| 6,416,182 | B1 | 7/2002 | Kakuda et al. | 353/20 |
| 6,542,298 | B1 | 4/2003 | Aoki | 359/483 |
| 6,547,400 | B1 | 4/2003 | Yokohama | 353/98 |
| 6,686,676 | B2 | 2/2004 | McNulty et al. | 313/112 |
| 6,686,691 | B1 | 2/2004 | Mueller et al. | 313/503 |
| 6,726,329 | B2 | 4/2004 | Li et al. | 353/20 |
| 6,791,259 | B1 | 9/2004 | Stokes et al. | 313/503 |
| 6,791,756 | B2 | 9/2004 | Swanson | 359/567 |
| 6,799,849 | B2 | 10/2004 | Kim et al. | 353/30 |
| 6,860,621 | B2 | 3/2005 | Bachl et al. | 362/373 |
| 6,871,982 | B2 | 3/2005 | Holman et al. | 362/331 |
| 7,059,728 | B2 * | 6/2006 | Alasaarela et al. | 353/94 |
| 7,213,945 | B2 * | 5/2007 | Yoneda et al. | 362/309 |
| 7,270,428 | B2 * | 9/2007 | Alasaarela et al. | 353/122 |
| 2002/0145708 | A1 | 10/2002 | Childers et al. | 353/85 |
| 2002/0171938 | A1 | 11/2002 | Nakajo et al. | 359/625 |
| 2002/0180351 | A1 | 12/2002 | McNulty et al. | 313/512 |
| 2004/0057027 | A1 | 3/2004 | Tani | 353/102 |
| 2004/0207816 | A1 | 10/2004 | Omoda et al. | 353/31 |
| 2004/0207823 | A1 | 10/2004 | Alasaarela et al. | 353/122 |
| 2004/0219464 | A1 | 11/2004 | Dunham et al. | 430/320 |
| 2005/0018141 | A1 | 1/2005 | Hosaka | 353/31 |
| 2005/0173048 | A1 | 8/2005 | Alasaarela et al. | 156/227 |
| 2005/0174779 | A1 | 8/2005 | Yoneda et al. | 362/294 |
| 2006/0139575 | A1 | 6/2006 | Alasaarela et al. | 353/31 |
| 2008/0037116 | A1 * | 2/2008 | Alasaarela et al. | 359/433 |
| 2009/0296049 | A1 * | 12/2009 | Teradaira et al. | 353/98 |

FOREIGN PATENT DOCUMENTS

| | | |
|---|---|---|
| EP | 1 235 281 A1 | 8/2002 |
| GB | 456520 | 11/1936 |
| GB | 1 211 027 | 11/1970 |
| JP | 04229244 | 8/1992 |
| JP | 10186112 | 7/1998 |
| WO | WO-94/22048 | 9/1994 |
| WO | WO-97/01128 | 1/1997 |
| WO | WO-03/005733 | 1/2003 |
| WO | WO 2006/072885 A1 | 7/2006 |

OTHER PUBLICATIONS

Wilson, Roland, "Nonimaging Optics" Chapter 10, pp. 235-263 (Consequences of Symmetry) Elsevier Academic Press, 2005.

* cited by examiner

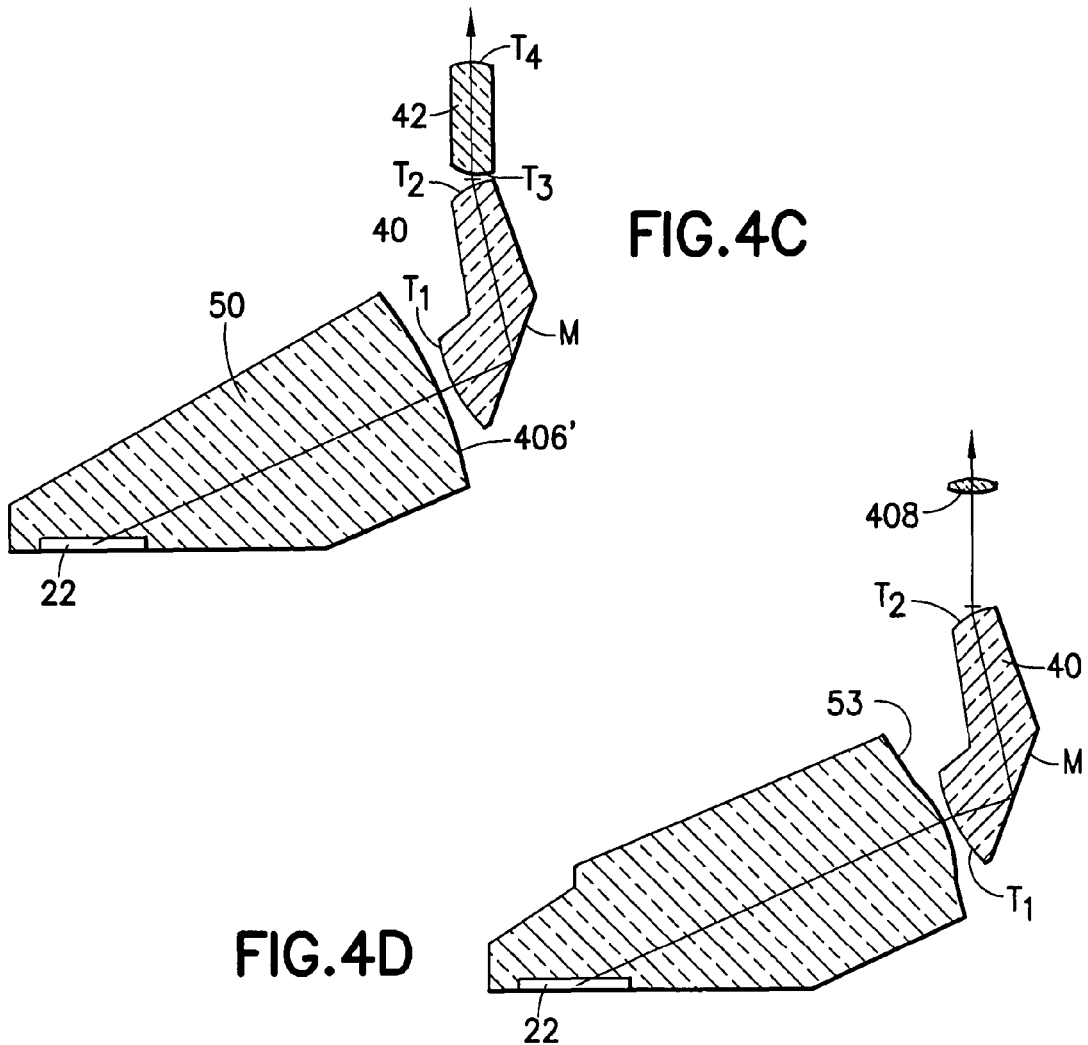
FIG.4C
FIG.4D
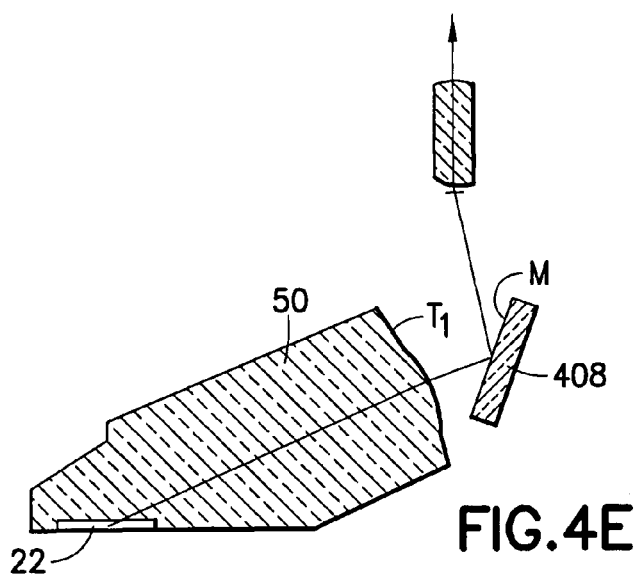
FIG.4E

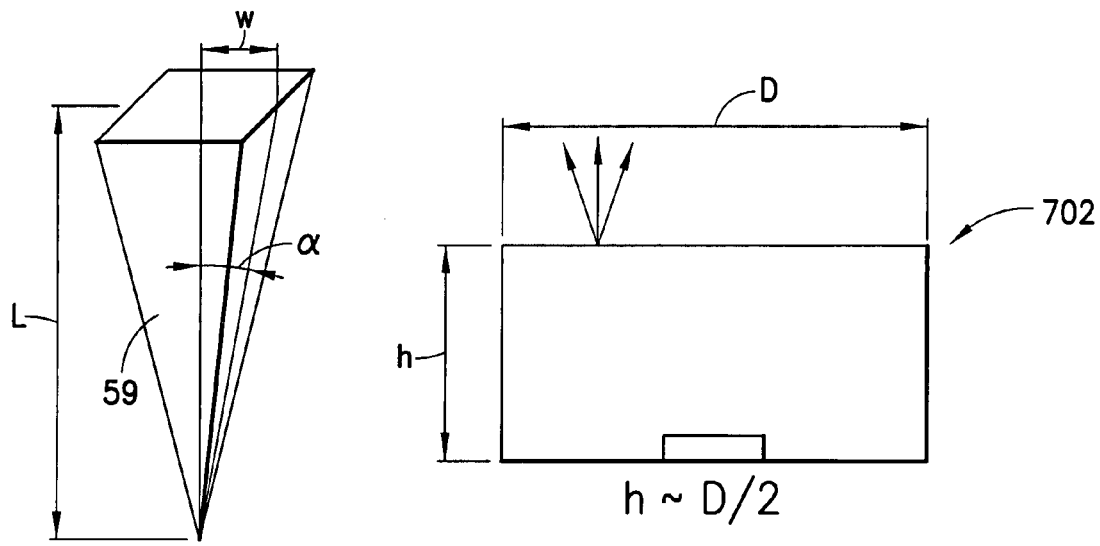
FIG.7B
FIG.7C
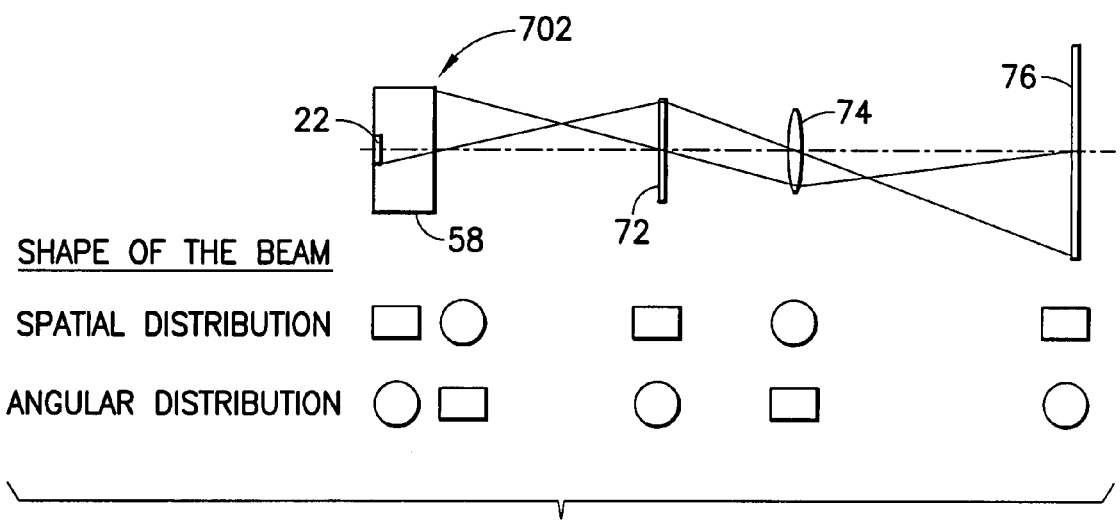
FIG.7D

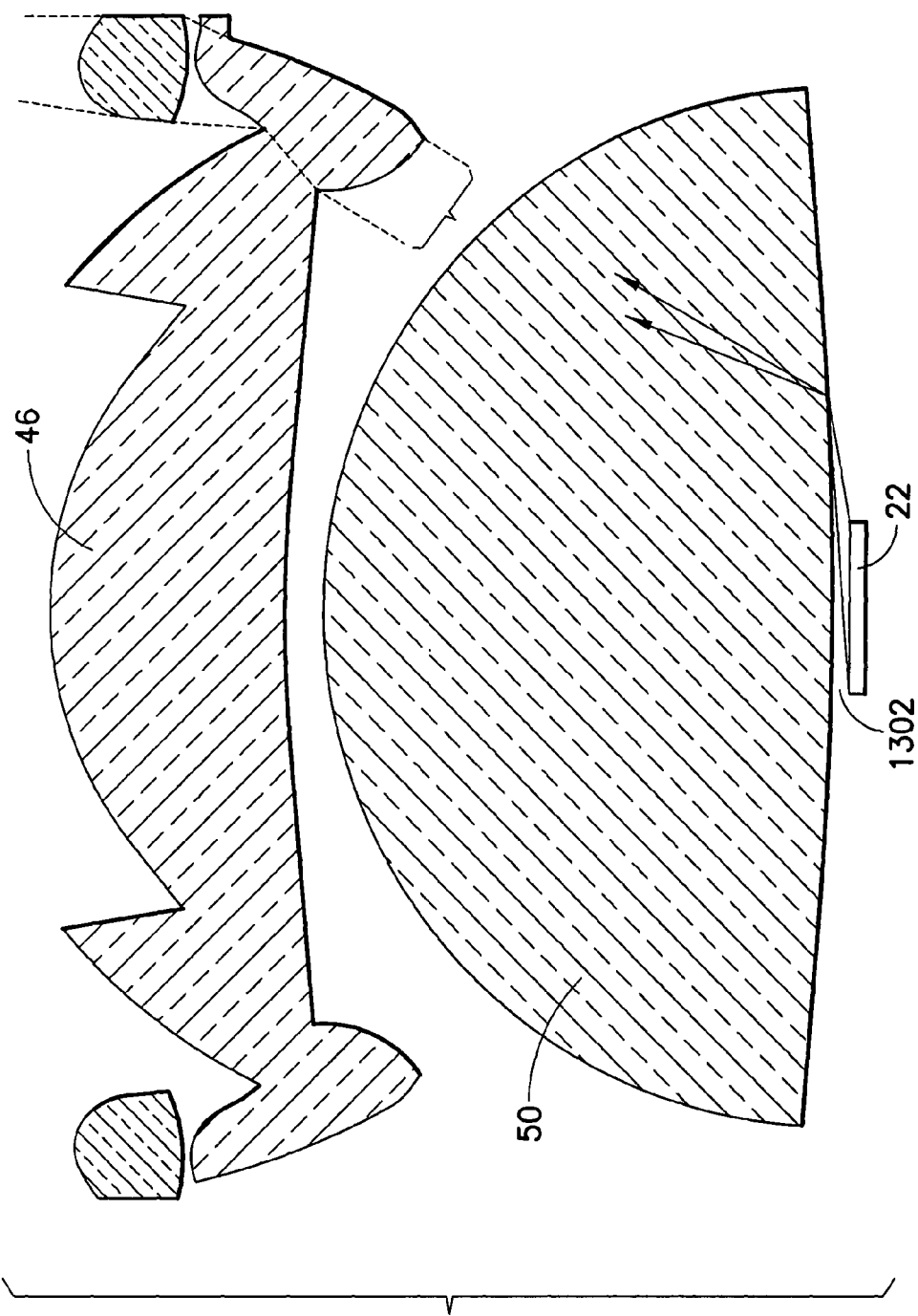

ILLUMINATOR METHOD AND DEVICE

CROSS-REFERENCE TO RELATED U.S. PROVISIONAL PATENT APPLICATION

This application claims priority to Provisional U.S. patent application Ser. No. 60/837,071, filed on Aug. 10, 2006, the contents hereby incorporated by reference in its entirety. This application is further related to commonly assigned U.S. Pat. No. 7,059,728 (issued Jun. 13, 2006) and its continuation U.S. patent application Ser. No. 11/407,829 (filed Apr. 18, 2006, allowed May 29, 2007), now U.S. Pat. No. 7,270,428, also incorporated by reference herein in their entirety.

TECHNICAL FIELD

The exemplary and non-limiting embodiments of this invention generally relates to imaging of radiation, specifically to collection, collimation and concentration of radiation. More particularly, these embodiments concern certain components of an optical system that capture rays at large angles to the system optical axis and collect and redistribute those rays to form an illumination quality image of an object or data.

BACKGROUND

How to collect all the light emitted from a certain source and further to shape the beam into a desirable form is a well known problem. An ideal solution for many applications would be to image the source by using the rays emitted to one hemisphere about the source. Here the term 'imaging' does not mean image forming with minimized aberrations but merely imaging with a sufficient quality for illumination.

One well-known approach is to use high-NA (numerical aperture) objectives, like aspherical pick-up lens systems or microscope objectives. These solutions are either large in respect to the collected etendue, or incapable to form good enough image from the object. These systems may also be complex and expensive. These teachings take a different approach. Instead, embodiments of this invention make it possible to form an illumination quality image of an object by using the rays emitted at large angles to the optical axis of the imaging system (e.g., side-emitted rays).

The light collection problem becomes more difficult if one needs to collect all the light emitted from a source which is inside a material whose refractive index n is larger than that of the surrounding material, typically air (n=1). Typically, large angle collection is possible only if the source is in air. If the source is encapsulated in higher refractive-index material, typical collection optics tends to be too large to be useful. Additionally, many typical optical collection solutions (such as collection lenses, TIR-collimators, tapered lightpipes, parabolic concentrators) only collect light and other components are needed to shape the beam to a desired form such as a uniform rectangle for example. That results in a larger optical system size and additional losses due to the increased number of discrete components or due to increased etendue of the beam. Embodiments of this invention address this problem in that the components described make it possible to form image of an object at large angles even when the object is inside a material with an index of refraction greater than the surrounding material.

In many applications it would be advantageous to have a very low-F-number objective, technically an ultra-high numerical aperture, which need not have perfect imagery but rather a high throughput. Embodiments of the invention address this issue in that the numerical aperture of the components described herein can be equal to the refractive index of the material by which the object to be imaged is surrounded.

There are other design considerations where an object or data needs to be imaged from angles far from the optical axis. For example, in some applications the optical axis is blocked or unavailable for direct imaging due to other uses, and there is also a need to illuminate the object with high throughput. As will be seen below, embodiments of the invention address that problem also.

In miniature LED projection engines, one difficult problem is how to couple the light from the LED chip through a rectangular microdisplay and the projection lens onto the screen. This needs to be done efficiently and in a small space and still provide uniform image quality. Those considerations are fully described and designed for in co-owned U.S. Pat. No. 7,059,728 by enclosing an LED source within an optical medium on one side and a reflecting substrate on the other. Light from the non-point LED source is distributed throughout the optical medium. Due to reflective and transmissive surfaces having micro-scale diffractive and/or refractive surface patterns, the distributed light is collected into a rectilinear output with relatively uniform intensity. But in addition to those technical considerations, the illumination component(s) need to be mass-manufacturable at a reasonable cost. These teachings further address that challenge in that embodiments detailed herein provide an illumination system and method for LED (or other light source) based projectors which is small, has high efficiency and good uniformity, and is further efficiently mass-producible and robust.

The closest known prior art is seen to be a total internal reflection TIR-collimator, such as that used in the Mitsubishi® PK-10 LED projector. A schematic drawing of that TIR collimator and an image of the same are shown respectively at FIGS. 1A-B. The outer diameter of this component is about 20 mm. One problem seen with such a TIR collimator is that it collects the light but it does not form an image of the source so a separate fly's eye lens is apparently necessary in order to render the output illumination uniform and rectangular instead of a circularly symmetric. That causes either (or both) loss of light or increase of system size by increasing the etendue of the beam.

Separately, the concentration of light from a diffuse light source is required for many applications. One good example is the concentration of solar radiation. In solar concentration some problems with prior art systems known to the inventor is that they are incapable of concentrating light with near the maximum concentration ratio, and they are physically large with respect to the power they deliver. Some renditions also require some optical surfaces to be in near proximity to the location where light is concentrated, which can cause severe problems when a maximum concentration ratio is used because that optical surface will be affected where the light has a very high intensity. Also, for prior art concentrators that are based on parabolic reflectors, the heating element is disposed above the parabolic mirrors, which is a difficult physical arrangement. Embodiments of this invention address these concerns in that the components described can be used to concentrate light with a concentration ratio close to the theoretical maximum, but without the above problems. Specifically, a solar concentrator according to the teachings below may exhibit an almost maximum possible concentration ratio, with no optical surfaces near the heating element, and with the heating element below the concentrator which enables the heating element to be in a fixed position so that only the concentrator needs to track the movement of the sun.

In other fields such as microscopy or the optical measurements field, certain applications require a bright spot of light. This also is an advantageous deployment of the embodiments detailed below.

SUMMARY

In accordance with one embodiment of the invention is an apparatus that includes first and second ray guides, of which at least the first is toroidal. The first toroidal ray guide defines an axis of revolution and has a toroidal entrance pupil adapted to image radiation incident on the entrance pupil at an angle to the axis of revolution between 40 and 140 degrees. The first toroidal ray guide also has a first imaging surface opposite the entrance pupil. The second ray guide also defines the same axis of revolution and has a second imaging surface adjacent to the first imaging surface.

In accordance with another embodiment of the invention is a method that includes emanating light from a source disposed along an optical axis at an angle between 40 and 140 degrees from the optical axis, receiving the emanated light at an entrance pupil of a circularly symmetric ray guide arrangement, where the circularly symmetric arrangement is circularly symmetric about the optical axis, and then redirecting the received light through the circularly symmetric ray guide arrangement to an exit pupil in an average direction substantially parallel to the optical axis.

In accordance with another embodiment of the invention is an apparatus that includes at least one ray guide substantially cylindrically symmetrical about an axis; said at least one ray guide being arranged to substantially image at least a portion of rays which emanate from a non-point object towards an entrance pupil of the said at least one ray guide to an image. In each individual cross-sectional plane which includes the said axis and a portion of the entrance pupil, said at least one ray guide is arranged to image an individual subset of the rays which emanate from the non-point object along the individual cross-sectional plane towards a portion of the entrance pupil which is on the individual cross-sectional plane and on one side of the axis to an intermediate image on the individual cross-sectional plane, and to further substantially image the at least portion of the rays from the intermediate image to an cross-sectional image on the cross-sectional plane, which cross-sectional image substantially coincides with a cross-section of the image at the said individual cross-sectional plane, such that no ray of the individual subset of rays crosses the axis between the first and last intersection of the ray with the cross-section of the at least one ray guiding components which are on the same side of the axis than the said cross-section of the entrance pupil.

In accordance with another embodiment of the invention is an apparatus that includes at least one ray guiding component that is substantially cylindrically symmetrical about an axis of revolution. The at least one ray guiding component is arranged to substantially image at least a portion of the rays, which emanate from a non-point object towards an entrance pupil of the said at least one ray guiding component, to an image. The at least one ray guiding component is further arranged to substantially image the entrance pupil into an exit pupil of the said at least one ray guiding component, such that each point on the entrance pupil is substantially imaged to a projection of the point substantially along the direction of the said axis of revolution on the exit pupil. Further, the at least one ray guiding component is arranged to have substantially all points of the entrance pupil at approximately a same distance from the object. The at least one ray guiding component is also arranged so that no path of any meridional ray imaged from the entrance pupil into the exit pupil crosses the axis of revolution between the entrance pupil and the exit pupil.

BRIEF DESCRIPTION OF THE FIGURES

Aspects of these teachings are made more evident in the following Detailed Description when read in conjunction with the attached Drawing Figures, wherein:

FIGS. 4A and 4C-4G illustrate cross sections of various optical channels according to embodiments of the invention for large angles from the optical axis.

FIGS. 7A-C illustrate a mathematical construct of an illumination cone at an output pupil of the illuminator and relative dimensions according to an embodiment of the invention.

FIG. 7D is a schematic diagram showing spatial and angular distribution from a light source through an entire system to a display screen.

FIG. 13 is an embodiment showing an airgap between a light source and a dome to manage the angle of incidence to the ray guides.

DETAILED DESCRIPTION

Figure 1A:
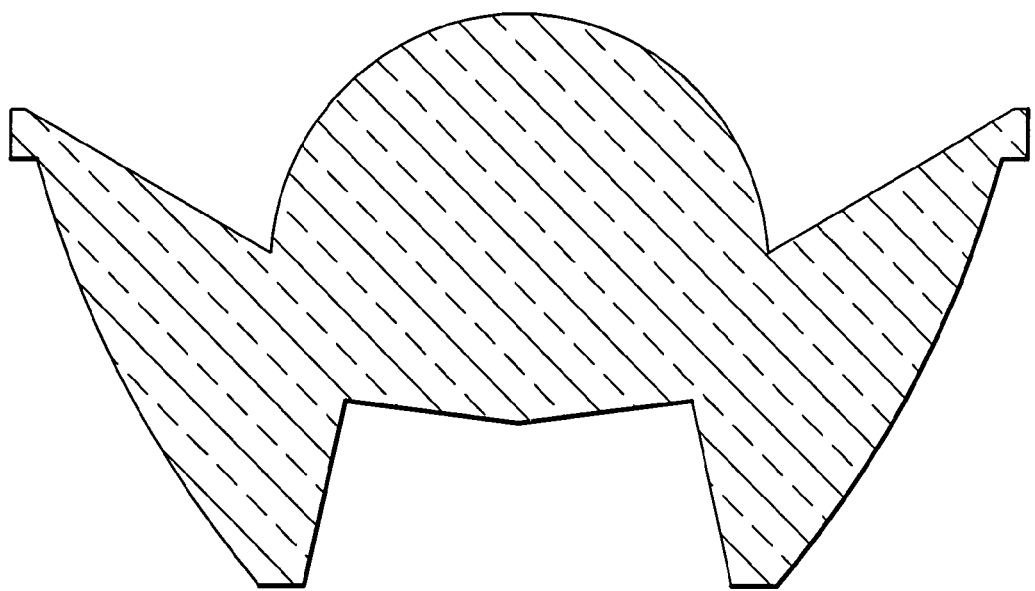
FIGS. 1A-B are various views of a prior art TIR collimator.
Figure 1B:
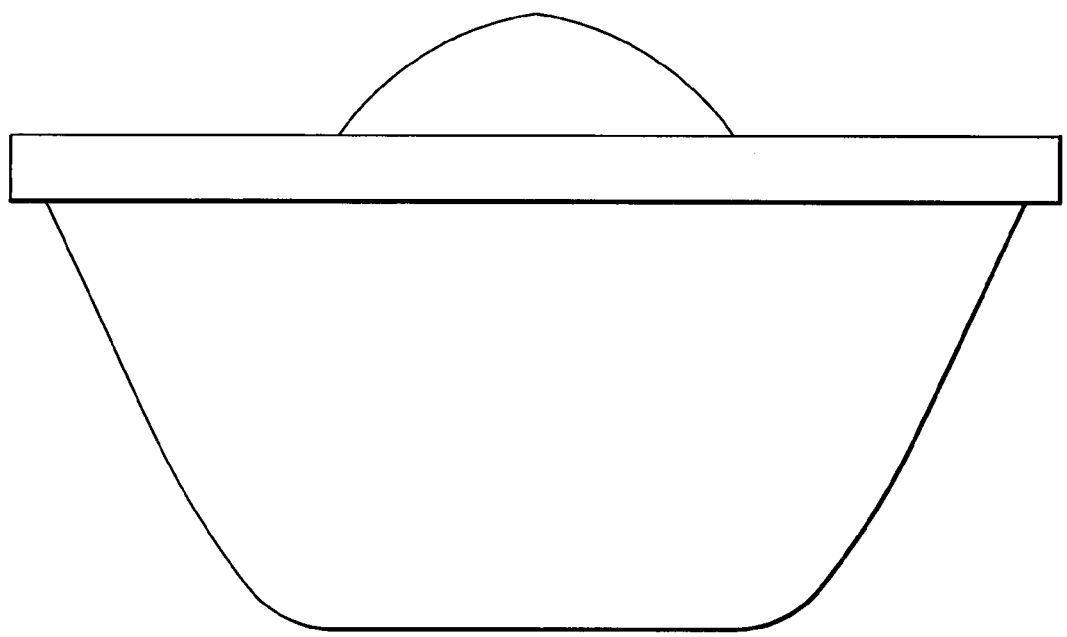

An embodiment of the invention is used as an LED illuminator employed as a component in particular in a miniature LED projector. Embodiments of the invention offer one or more of the following advantages.
1. The illuminator component has good efficiency, i.e. illumination efficiency is more than 50%, and can be even more than 80% (spectral transmission efficiency).
2. The illumination is so uniform and rectangular, that a separate beam homogenizer component, such as a fly's eye lens, is not needed (though one may be used).
3. The illuminator component has the advantage that it enables collection of light from a whole hemisphere about the light source (LED) in a small space even if the source is encapsulated in a higher refractive index material, such as many high-brightness LED chips are. When designed for non-encapsulated sources, the illuminator component does not need any optical surfaces to be in close proximity of the source, which is an important advantage (for thermal issues and material choices) in some applications, too.
4. The illuminator component also performs beam shaping, by using the shape of the source in beneficial way, i.e. the shape of the illumination is the shape of the source.
5. Etendue of the illumination can be preserved below 140% of the original etendue of the source, and even below 105% of the original etendue of the source.
6. The size of the illuminator component is very compact. The diameter of the component is determined by the etendue law, and the height of the illuminator component is typically half of the diameter. Specific size examples are given below.
7. The illuminator component has a circular outer shape, which enables good pupil matching with a projection lens in miniature LED projector applications. This enables a small overall size for the optical engine.
8. The output beam of the illuminator component can be very telecentric, meaning that polarization recycling sheets can be used above the illuminator component to increase efficiency in LCD or LCoS projector applications.
9. The uniform telecentric beam that the illuminator component forms may be used in a wide variety of optical configurations and applications.
10. The illuminator component can be mass-manufactured by injection molding. The molds can be made by diamond turning or precision NC machining, for instance.
11. In addition to miniature LED projectors, the illuminator component can be used in a wide variety of different applications including camera flashes, microscopes and head-up displays, for instance.

Consider an imager for which a planar object is to be imaged to a coplanar image at a distance L from the object. The optical axis connects the centerpoints of the object and the image, and that optical axis is perpendicular to the object plane and to the image plane. Magnification M of the imaging is the ratio of the heights of the image and the object. Near the optical axis the imager includes one or more lenses which image the object to the image. Such lenses operate on light incident at relatively small angles to the optical axis. Lenses can be designed by using conventional lens design principles. For example, an aspherical lens with focal length of $f=ML/(M+1)^2$ positioned at distance $R=L/(M+1)$ from the object can be used. This is conventional.

Embodiments of the imaging channels of this invention collect and manipulate light at larger angles from the optical axis. These may be supplemental to conventional lenses that operate at the smaller angles, so according to an embodiment an imager, illuminator, or concentrator includes one or more of the imaging channels described in detail below.

The description below is in the context of the light source being a light emitting diode LED. This is seen to be a highly advantageous source for many illumination applications described herein for its low power requirement and low heat output and adaptability for color-specific implementations (see for example the incorporated and co-owned U.S. Pat. No. 7,059,728), but is not a limiting factor for the scope of this invention; LED as source is merely an example of a extended light source for use with embodiments of this invention. Other light sources include an organic LED, photonic crystal LED, photonic lattice LED, resonant cavity-LED, LASER, an arc lamp, a light bulb, an optical fiber, and the like. The use of this invention is not limited to components which create light, but as well light source in this context can be understood to be for example any object which emits, reflects or scatters light, or it can be an image or virtual image of a source.

The off-the-shelf LED packages consist of a LED chip, which is the actual light emitting semiconductor chip, mounted on a substrate. In addition to that, high-efficiency LED chips may be encapsulated within a domed enclosure filled with an optically transmissive material having an index of refraction greater than that of air (greater than 1).

For purposes of this description, consider that an LED chip is rectangular and radiates into only a hemisphere (the active area actually radiates into a whole sphere, but typically there is a mirrored surface below the LED chip so radiation is restricted to roughly only one hemisphere). Assume that the desired illumination shape is rectangular, as is the case with most optical data projections (e.g., television, computer screen, screens of hand-portable devices such as MP3 players and mobile phones). The rectangular shape may be a square or a common 4:3 or 16:9 aspect ratio rectangle, for example. In order to fully optimize the size of the optical engine, the shape of the LED chip and the desired illumination should preferably be similar. So for example an optical engine that is intended to illuminate at a 16:9 aspect ration would preferably include a 16:9 aspect ratio LED chip as its source when an optical engine with minimized size is desired.

Figure 2A:
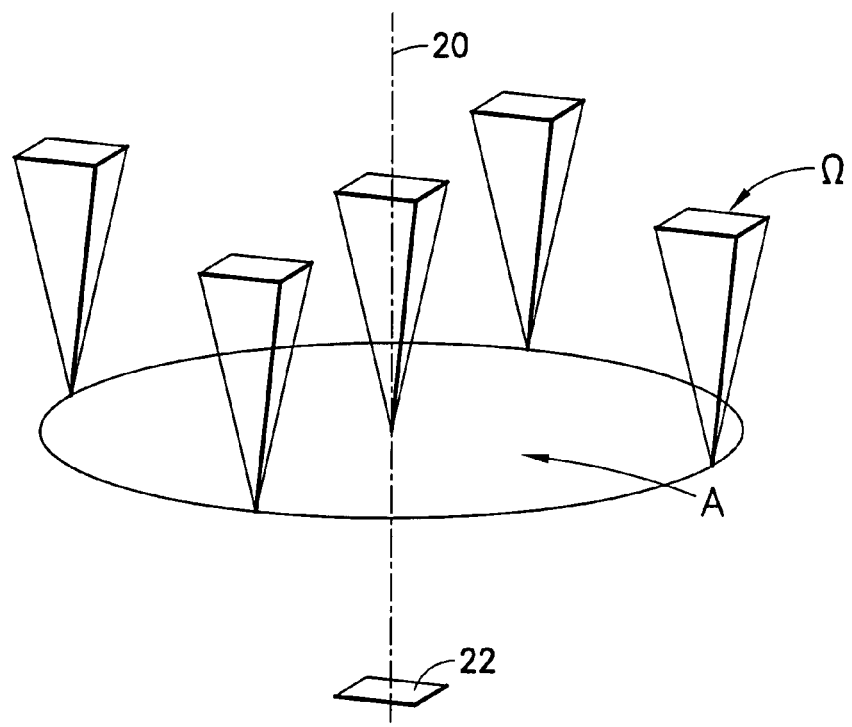
FIGS. 2A-D illustrate a mathematical model that embodiments of this invention address.

An important issue for solving the problem of imaging with light from relatively larger angles from the optical axis is properly approaching the problem: how can one modify a LED radiation pattern such that one gets a circular area radiating with a similar uniform rectangular cone from each location inside it? This is diagrammed at FIG. 2A. An important design consideration is that the etendue of the illumination i.e. $\Omega A$ should be as close as possible to the original etendue of the LED chip.

Figure 2B:
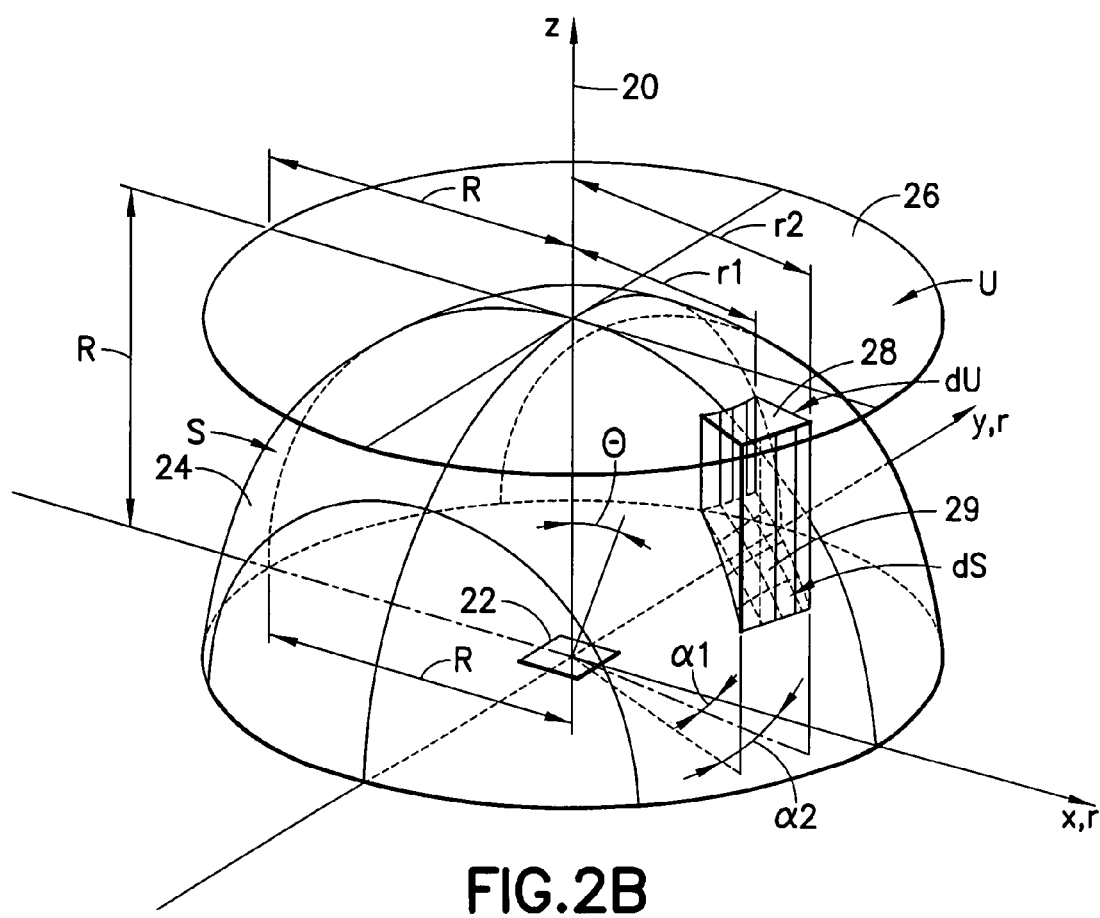

The solution detailed herein is based on the findings described next. FIG. 2B illustrates some dimensions and parameters used in formulating the mathematical solution. Let the z-axis be the optical axis 20. Circular coordinates in the xy-plane (perpendicular to the z axis) are defined by radius r and angle alpha $\alpha$. The angle to the optical axis 20 is denoted by theta $\theta$. Assume a rectangular Lambertian source 22 (e.g., LED chip) and place it on the xy-plane so that its center point is located at the origin. Let us suppose that under the LED chip, there is a mirrored surface so that only light going towards the upper hemisphere above the LED chip needs to be collected. Now form a hemisphere with surface S (24) having radius R centered at the origin. There is a circular area U (26) parallel to the xy-plane with radius R, and centered on the z-axis at a distance at least R from origin. (In FIG. 2B the distance is R but it could be larger as well). Now, consider a small arbitrary area element dU (28) inside the circular area U, defined by circular coordinates $\alpha_1$, $\alpha_2$, $r_1$ and $r_2$ (alpha1, alpha2, radius1, radius2). Now project that area element dU (28) onto the surface of the hemisphere S along the z-axis, thereby defining another surface element dS (29).

Now, let us suppose that we transform the light, arriving to the surface element dS (29), uniformly inside the surface element dU (28). When we do this transformation over the whole surface U (26), we have transformed all light, arriving from the LED chip to the hemisphere, onto the area U (26). However, at the same time we will get the illumination we wanted; similar uniform rectangular illumination patterns over the whole area U (26). The beam over the area U (26) will have the same etendue as the light source.

The next problem is how to implement that idea in a component which is still efficient to manufacture. The exact transformation would demand extremely complex structures, but we can approximate the desired transformation still obtaining good results.

Near the axis, i.e. when angle theta is close to the zero, the desired transformation is inherently done, i.e. no optics is needed even.

With small angle theta $\theta$, the solution is simple: a lens surface will do a good transformation. For example, if the LED is encapsulated inside a material having a refractive index n=1.5, a lens surface whose radius of curvature is approximately R/2 and whose center of curvature is located at the optical axis and approximately at distance R/2 from the LED chip will form the desired light output pattern, as shown at FIG. 2C in the two projections nearest the optical axis z (20). The exact shape of the surface can be designed with optical design software. When only one surface is needed the best shape is typically aspherical.

However, as can be seen at FIG. 2C, as theta $\theta$ increases, the lens surface 30 comes closer to the chip, and so the cone 32 of the beam becomes larger than a corresponding cone 34 of a beam emanating from a smaller angle theta $\theta$ nearer the optical axis 20, and illumination (i.e., intensity of the illumination) is no longer uniform. Additionally, these cone shaped projections 34 resulting from the larger theta $\theta$ angles become distorted further away from the ideal rectangular. Finally at large theta $\theta$ angles the light becomes total internal reflected TIR 36 from the lens surface 30, for example when theta $\theta$ approaches about 45 degrees. As noted above though, the lens performs well for small theta $\theta$ angles.

Figure 2D:
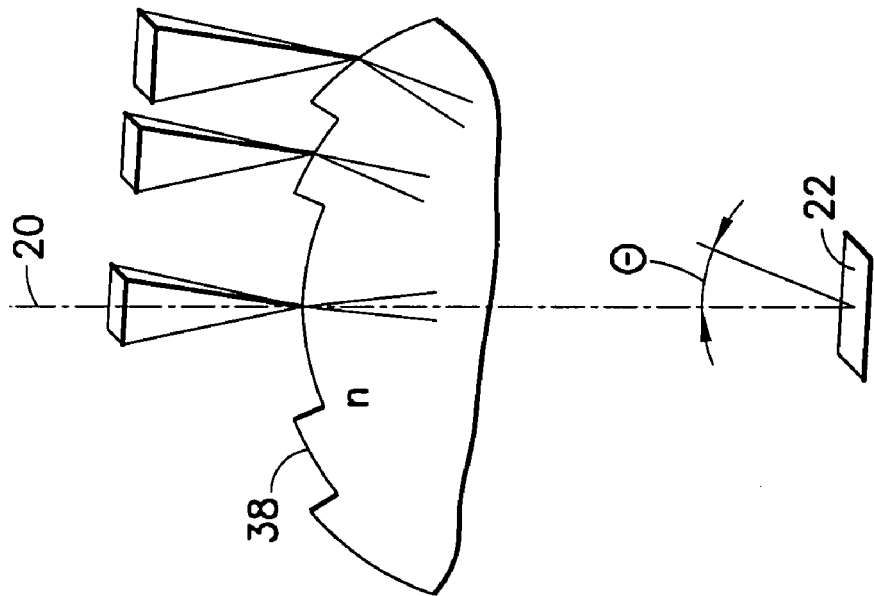
Figure 2C:
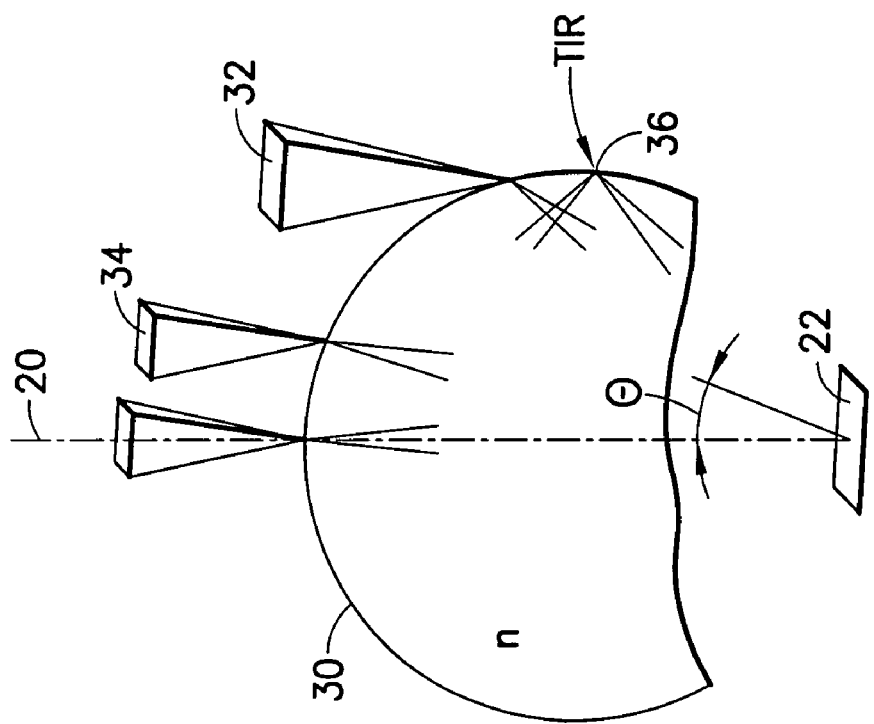

The maximum theta $\theta$ for using a lens as a good approximation can be extended for example up to about 40 degrees by using a Fresnel-lens like structure 38, as shown in FIG. 2D, depending on the quality of the needed illumination. The Fresnel-lens structure has the advantage that the illumination uniformity and image distortions can be improved because the surface height and angle are not tied together so strongly as with smooth lens like surfaces. Drawbacks are possible losses of light and increases in etendue in the surface direction discontinuities.

Figure 2E:
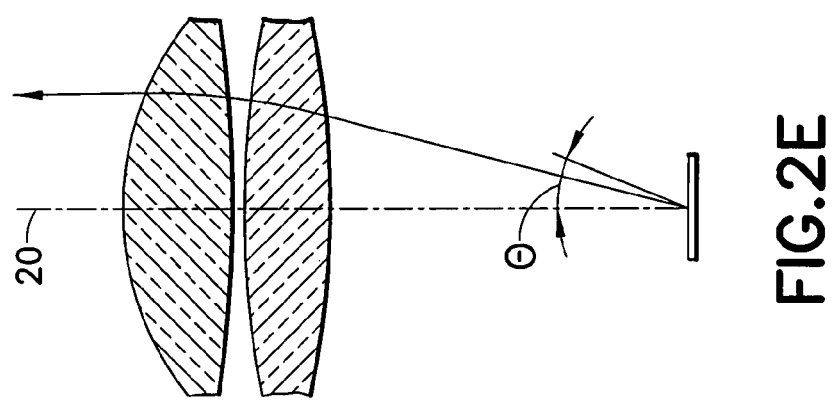
FIG. 2E shows a dual lens arrangement.

Of course several optical surfaces can be used instead of only one, for example two or more lenses as shown in FIG. 2E. However, these lens solutions start to have similar problems as described above, when theta increases further away from the optical axis 20.

Figure 3:
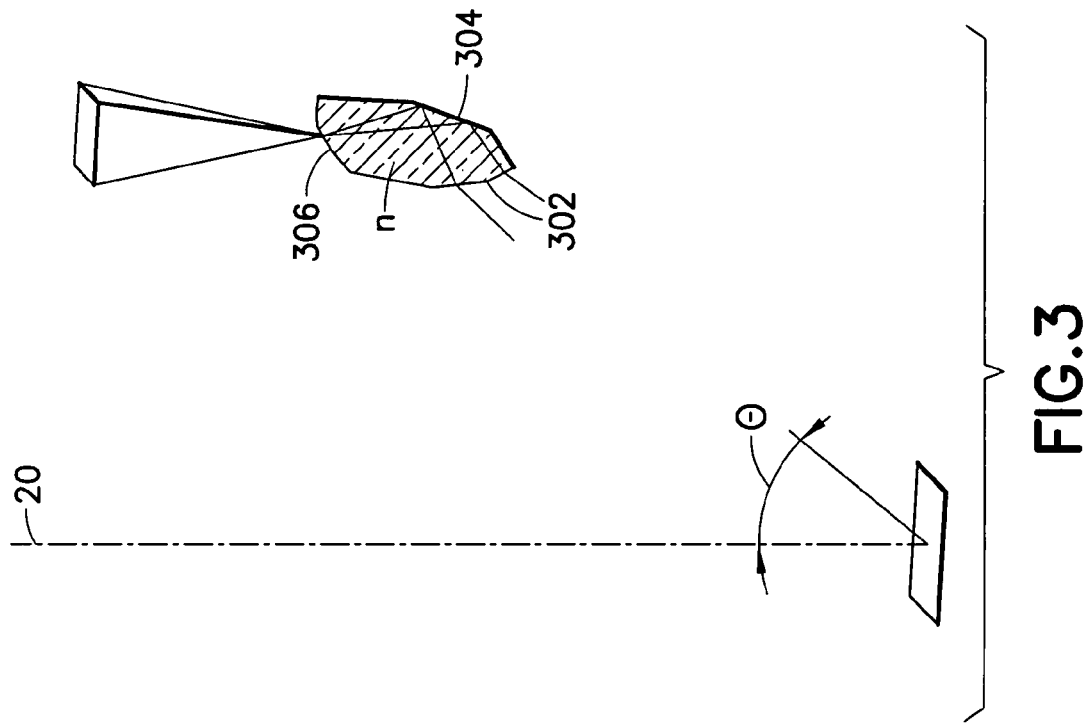
FIG. 3 illustrates catadioptric ray guiding component.

Around medium theta $\theta$ angles (i.e. near 45 degrees for example) where abovementioned lens or Fresnel-lens like structures 38 cannot be used, the desired transformation can be approximated for example by a mirror or a catadioptric structure for example such as shown at FIG. 3, which contains the first refractive surface 302, a mirror surface 304 and the second refractive surface 306. The mirror surface 304 can be either TIR-based or a mirror coated surface.

Figure 4A:
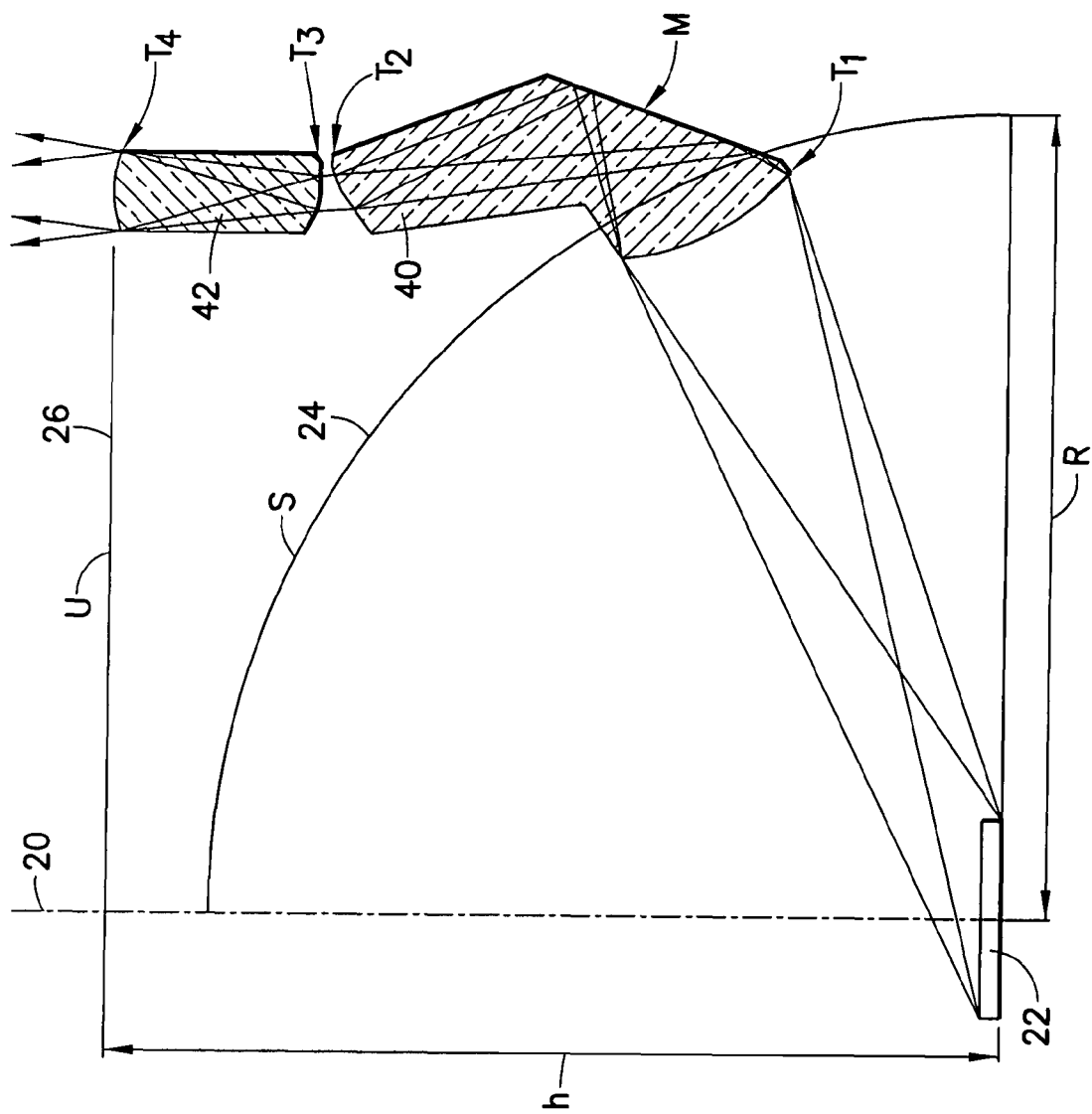

For larger theta $\theta$ angles, the transformation can be done by using one or more structures that form an "imaging channel" according to these teachings. Such imaging channels are cylindrically symmetric. A cross section of an exemplary imaging channel is shown in FIG. 4A.

The imaging channel shown is made in two distinct cylindrically symmetric components, ray guides, 40, 42, and defines torus-like surfaces $T_1$, $T_2$, $T_3$ and $T_4$; mirror surface M; and other surfaces which are considered as side surfaces. Consider 40 as a first ray guide which is a mirrored ray guide and 42 as a second ray guide which is not mirrored. As can be seen from the ray tracings the first 40 and second 42 ray guides are in optical series with one another. The surface $T_1$ forms an entrance pupil (i.e. channel input) for light from the LED 22 as can be seen by the ray traces in FIG. 4A, and the surface $T_4$ forms an exit pupil (i.e. channel output) for light entering the entrance pupil $T_1$ as can be seen by the emanating rays at FIG. 4A. In this exemplary imaging channel, this entrance pupil accepts light that emanates from the LED 22 at angles about 40 degrees and greater as measured from the optical axis 20. The imaging channels can be adapted to image at closer angles as will be seen, but the arrangement of FIG. 4A for the larger angles solves the more difficult problem in designing the overall optical engine. The surfaces $T_1$, $T_2$, $T_3$, $T_4$ and M are torus-like surfaces and do not have imaging power in tangential direction, but when looking at the cross-section plane we can speak about imaging in this cross-sectional plane. Both the cross section we describe and the optical axis 20 lie in such a plane, which in FIG. 4A is the page itself. The ray guides 40, 42 themselves are toroidal in shape, as if the illustrated cross sectional views were rotated about the axis of rotation 20 to define the exterior surfaces of those ray guides 40, 42. In any cross-sectional plane surface $T_1$ images light from the LED chip through the total-internal-reflection mirror M into an intermediate image approximately between the surfaces $T_2$ and $T_3$. Surfaces $T_2$ and $T_3$ together image surface $T_1$ onto surface $T_4$. Finally, surface $T_4$ images the intermediate image to infinity and forms a rectangular telecentric illumination pattern. In other words, in the radial direction (i.e. in any cross-sectional plane) the desired transformation is formed. It may be rough because, for example, surface $T_1$ might not be exactly along the hemispherical surface S. Additionally, the illumination across surface $T_1$ may not be uniform because of the Lambertian cosine law. However, this is a good approximation and is capable to provide well enough the desired transformation. If the ray guides 40, 42 are narrow, the transformation is more accurate but manufacturing the ray guides 40, 42 becomes more difficult. By optimizing the imaging channel geometry by using aspherical cross-section surfaces it is possible to implement the desired transformation very accurately.

In the tangential direction, the desired transformation is formed roughly, due to cylindrical symmetry. In the tangential direction, the angular magnification is defined by the distance of the imaging channel input side (the entrance pupil, $T_1$ in FIG. 4A) and the output side (the exit pupil, $T_4$ in FIG. 4A) from the optical axis. That is because of the cylindrical symmetry of the optical components, from which it follows that the skewness of each ray is invariant. Skewness is the product of the distance of the ray from the optical axis 20 and the tangential component of the ray. Because channel entrance and exit pupils are spaced the same distance (on average) from the optical axis, the tangential component at the exit pupil is therefore the same as at the entrance pupil, which means that the desired transformation is formed. This teaching of the invention is called here as the rule of equal radius.

A particular ray from the LED 22 might take reflection by total internal reflection from the side surfaces, which recovers otherwise lost light.

There are also other possible imaging channel structures, which do the same function. For example, the mirror surface M can be mirror coated if total-internal-reflection can not be used in some geometrical cases. The mirror surface M can be between surfaces $T_3$ and $T_4$ instead of between surfaces $T_1$ and $T_2$. The mirror surface M can also lie between surfaces $T_2$ and $T_3$ (for example if both ray guides had a cross section similar to that of the second ray guide 42 and the mirror surface were not incorporated into one of the ray guides but disposed between them), and be formed by mirror coating a separate component or a portion of the imaging channel adjacent to the imaging channel in question, or by using a separate component with a prism shaped cross-section for example.

Figure 4B:
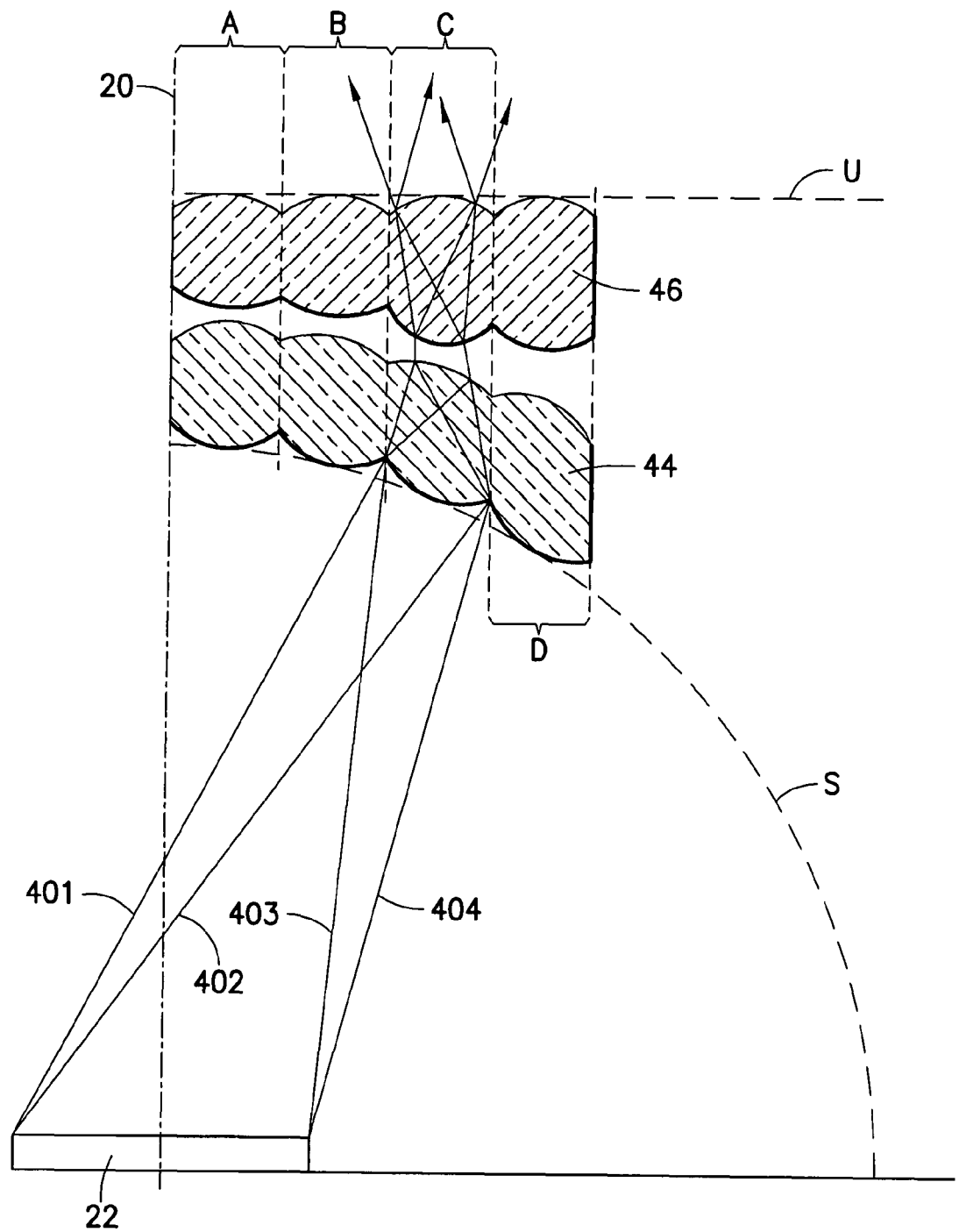
FIG. 4B illustrates such channels for small angles from the optical axis.

The use of the imaging channels is not restricted only to the larger theta angles i.e. in directions forming large angle to the optical axis, but they can as well be used in a beneficial way closer to the optical axis. If the distance h of the area U 26 from the origin is substantially larger than the radius R of the hemisphere S 24, it might be difficult to use the lens-like structure 38 at the center (near the optical axis) because the opening angle requirement does not match with the lens surface position requirement. In that case it is possible to use an imaging channel structure without the mirror-surface in that central area, as shown in FIG. 4B. At FIG. 4B, two ray guides 44, 46 are shown in cross section and configured to span the optical axis 20. The two ray guides form four imaging channels A, B, C, D (offset by dashed lines) which do not have the mirror surface M. These ray guides 44, 46 have imaging surfaces not unlike those detailed in FIG. 4A, but since they receive incident light from angles nearer the optical axis 20 there is no need for a mirror surface M. Raypaths 401, 402, 403, 404 illustrate the imaging function of imaging channel C in the cross-sectional plane. This illustrates one embodiment of an imaging channel which can be used closer to the axis.

Note that above described imaging channel with a mirror surface forms a mirror image of the source, just like a lens or Fresnel lens system does near the optical axis. In the tangential direction, only a mirror image of the source 22 can be formed in an imaging channel. However, the above described imaging channel without a mirror surface forms an image of the source 22 which is not a mirror image in the cross-sectional plane. Therefore the channel without a mirror surface does not form an image of the source unless the source is substantially axially symmetric. Therefore such a channel is suitable to be used for illumination purposes with substantially axially symmetric sources in particular. However, such a channel can also be used with non-axially symmetric sources, such as rectangular sources for example, if a certain amount of non-imaging is desired for smoothing the image of the source for illumination purposes for example.

One embodiment of the illuminator uses both imaging channels with a mirror surface and imaging channels without a mirror surface. Such an illuminator forms both mirror images and non-mirror images of the source in the radial direction, and those images are laid on top of each other at the image plane (beyond the exit pupil). Such illuminators can be used to create more uniform illumination from a source, than what would be obtained with direct imaging of the source.

It is possible to modify the presented channel structures in many ways so that the innovative idea is the same. Individual functional surfaces can be embodied as several surfaces, or several functional surfaces can be combined to one surface as long as the innovative idea and the desired transformation is formed. Some volumes (e.g., between $T_2$ and $T_3$) may be filled with a material but as well it can be air, and some air gap may be changed to some transmissive material. It is possible to implement many of the described optical functionalities in various different ways, for example diffractive optics or photonics crystals or lattices can be used instead of refractive and/or reflective optics. Materials, and refractive indexes of the various ray guides and parts can be varied, too. Surfaces can be antireflection or high-reflection coated for improved performance. So, the scope of this invention is not limited by the configurations illustrated here.

FIGS. 4C, 4D, 4E, 4F, and 4G illustrate some other exemplary embodiments of the imaging channel.

FIG. 4C shows the same structure which was presented in FIG. 4A but with a LED chip 22 which is encapsulated inside a transmissive dome 50. Note that instead of one surface for imaging the LED chip to the intermediate image (at the cross-section plane), there are two: the dome surface 53 and the lower surface of the lower ray guide 40, and there would be three, if the mirror surface M would have any optical power (as it could have as well).

FIG. 4D shows the same imaging channel structure as FIG. 4C but where the function of the upper (second) ray guide 42 is implemented by having a stronger curvature on the upper surface $T_2'$ of the lower (first) ray guide 40 (i.e. the surfaces $T_2$ and $T_3$ of FIG. 4C are replaced with only one surface $T_2'$ having the same power as $T_2$ and $T_3$ together), and a toroidal lens 408 having two surfaces instead of one surface $T_4$ for imaging the intermediate image into the image (in the cross-section plane).

FIG. 4E shows another imaging channel with a mirror surface M, where surface $T_1$ is integrated with the dome 50 and the TIR-mirror surface is replaced with a separate cylindrically symmetric mirror component 408.

Figure 4F:
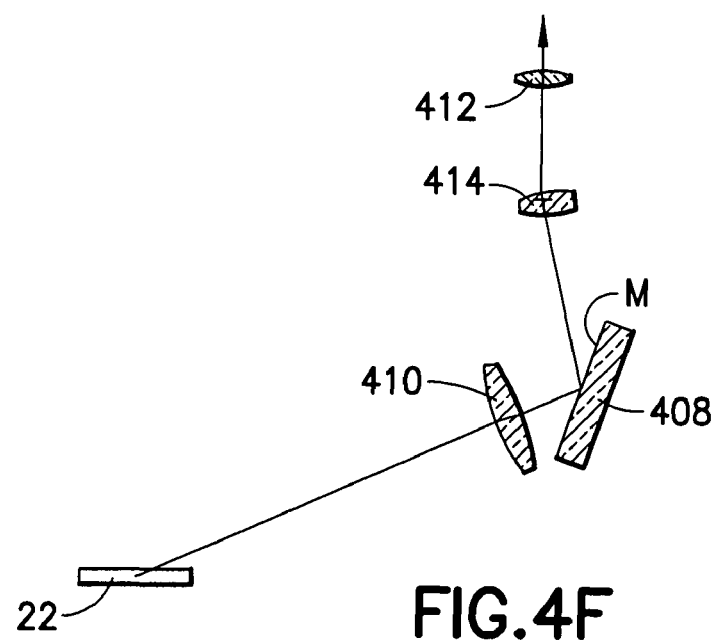
Figure 4G:
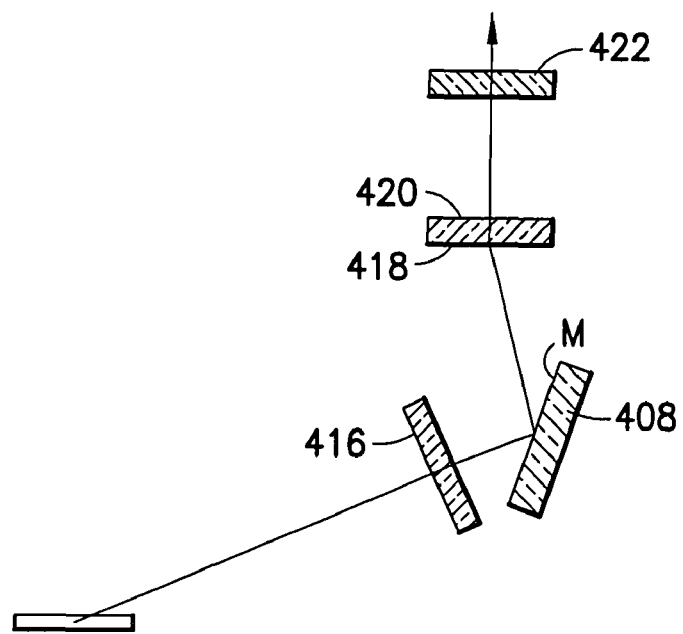

FIG. 4F shows still another imaging channel with a mirror surface, where surfaces $T_1$ and $T_4$ are both replaced with toroidal lenses 410, 412, surfaces $T_2$ and $T_3$ are replaced with one toroidal lens 414 and the mirror is replaced with a separate cylindrically symmetric mirror component 408.

FIG. 4F shows still another imaging channel with a mirror surface, where surfaces $T_1$, $T_2$, $T_3$ and $T_4$ are replaced with cylindrically symmetric surfaces 416, 418, 420, 422, with planar cross-section, containing micro-optical features such as diffractive optical structures or small scale Fresnel lens structures. The mirror is replaced with a separate cylindrically symmetric mirror component 408.

By combining the abovementioned imaging channels or their variations together with for example a lens, a Fresnel lens, or catadioptric structures near the axis, it is possible to implement the desired transformation with sufficient accuracy for a whole hemisphere about the source 22. Because imaging channels can be implemented by numerous different embodiments, it is possible to choose the implementations so that the manufacturing phase can be simplified by integrating some of the parts together. That is an advantage of the invention, too. Toroidal lenses, Fresnel lenses, catadioptric structures, or components with micro-optical or diffractive optical structures can all be called ray guides, because they guide rays. So the concept of ray guide is not limited to the structures such as shown in the example above, but it is understood to be any component or portion of a component, which guides rays, i.e. changes the propagating direction of at least some ray.

FIG. 5A-5E show imaging channels such as those shown in FIG. 4A disposed together as a LED illuminator over a Luxeon K2 LED package.

Figure 5A:
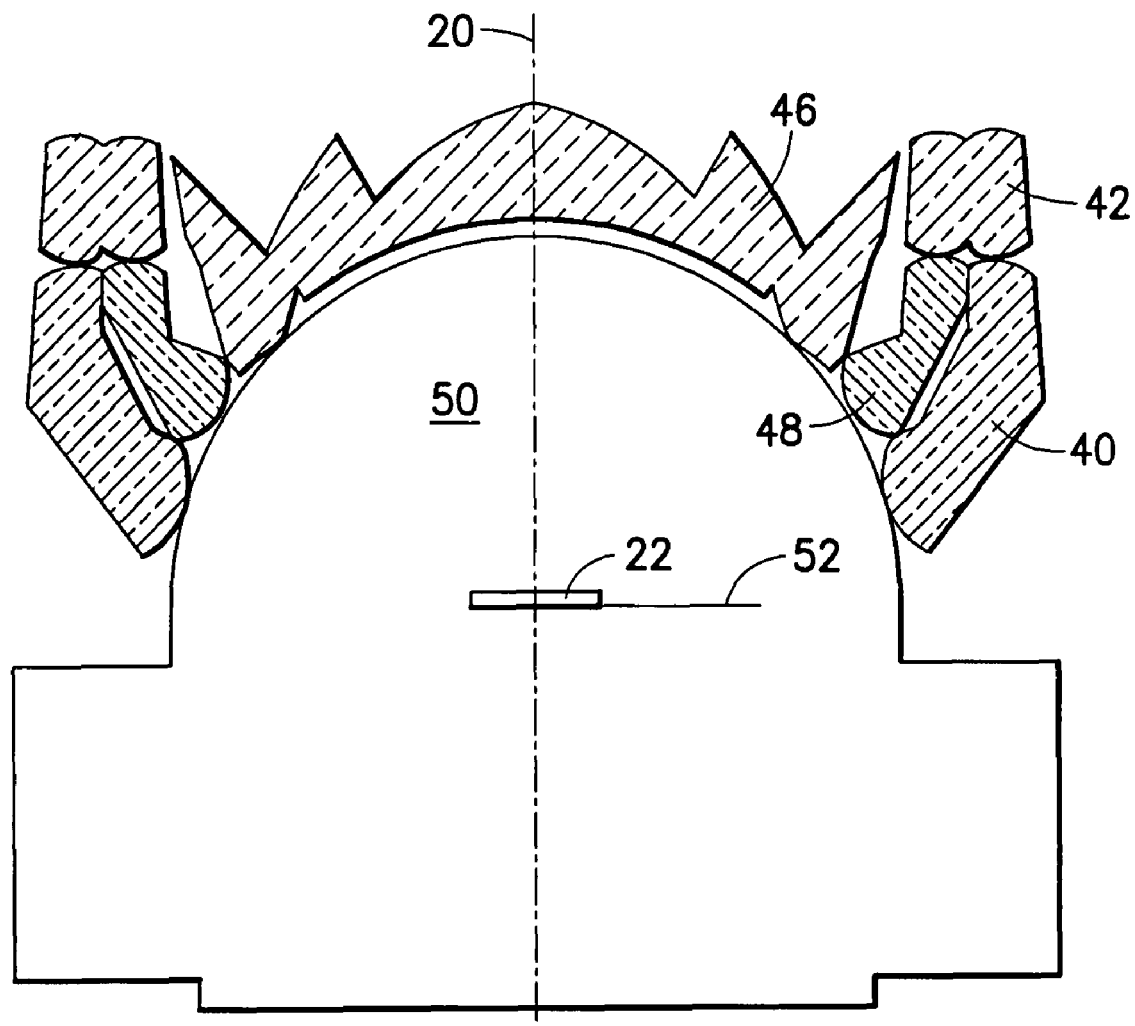
FIGS. 5A-E illustrate various embodiments of an illuminator and further detail of ray guides that form the optical channels according to an embodiment of the invention.

FIG. 5A shows an embodiment of a LED illuminator with dimensions in millimeters where there is a Fresnel lens near the axis, surrounded by the above described catadioptric mirror structure, and two imaging channels. The upper portions of the two channels are integrated into one ray guide 42 for easier manufacturing. The parts of the component are designed for optical grade PMMA plastics.

Figure 5B:
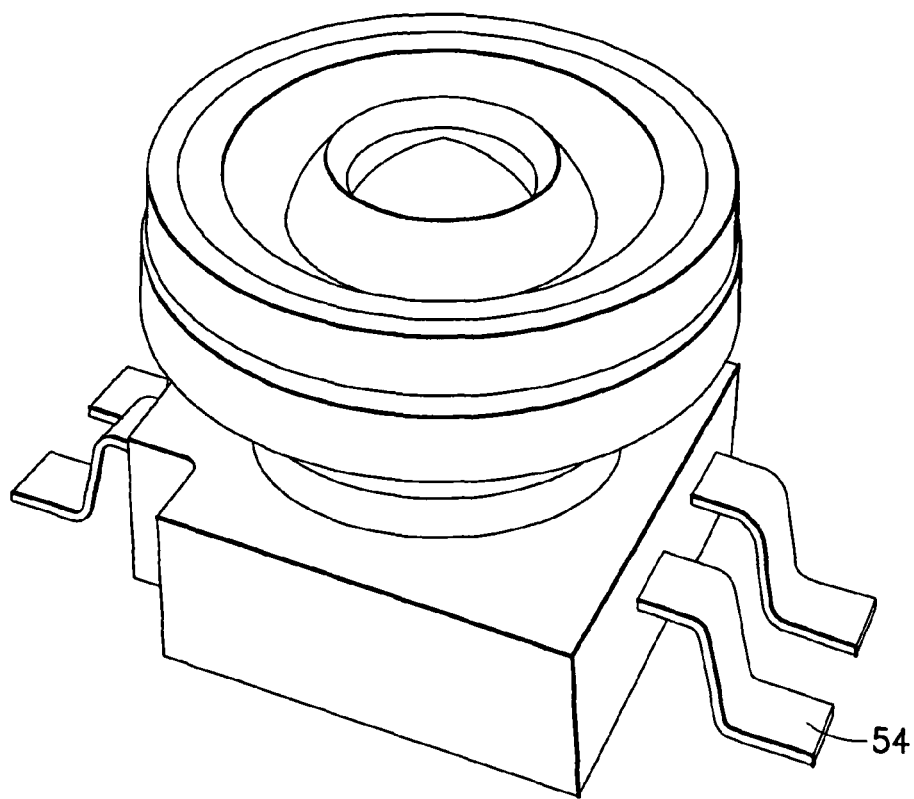

FIG. 5B shows a 3D-view of the same LED illuminator, showing the circular symmetry of the component.

Figure 5C:
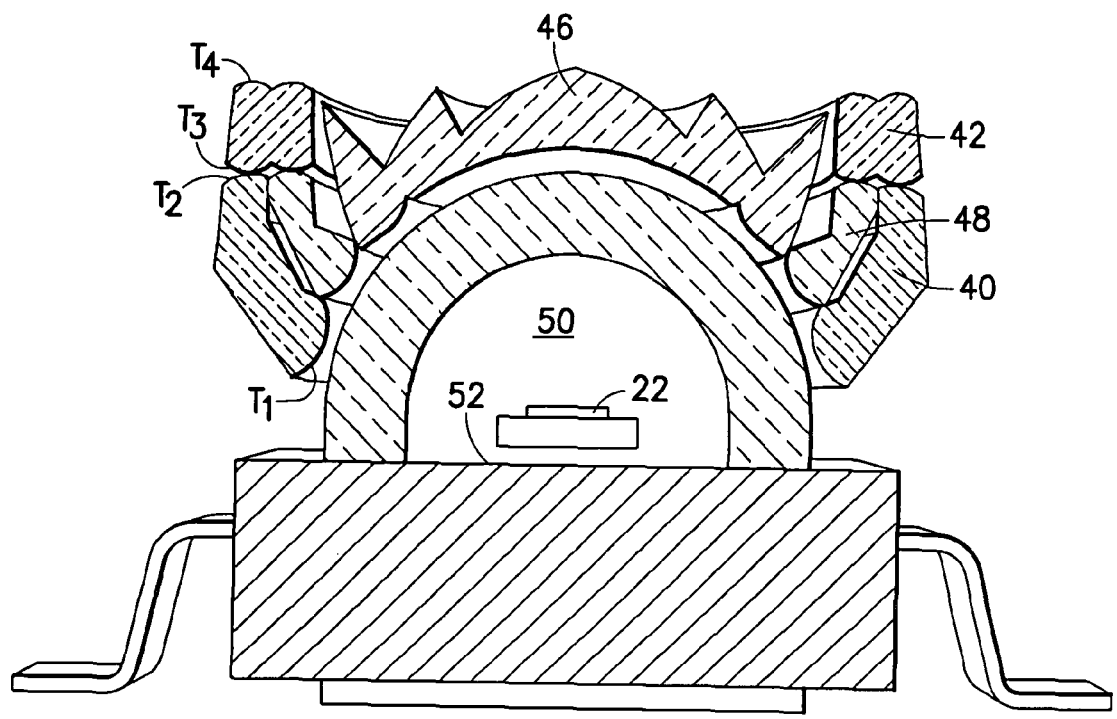

FIG. 5C shows a cross-sectional cut of the same LED illuminator.

In other words, FIG. 5A shows a schematic sectional drawing of an embodiment of the inventive LED illuminator using a commercial LED chip (Luxeon K2) spaced from a mirrored surface of a substrate. Four different ray guide (structures) are shown in cross sections 40, 42, 46, and a third ray guide 48 which operates in principle like the first optical ray guide 40 but adapted for the slightly different entrance angle of light due to its position inboard of the first ray guide 40. The second ray guide 42 is shown as one but could be made in separate parts to separately 'image' light from both the first ray guide 40 and the third ray guide 48. The ray guides 40, 42, 46, 48 may be a unitary structure. The LED 22 is enclosed on one side in an optically transmissive dome 50 mounted to a mirror surface 52. Measurements are in millimetres but embodiments may be expanded/contracted over those measurements proportionately. FIG. 5B shows the circular symmetry of the various channels and of the overall component, and FIG. 5C is a sectional view of FIG. 5B showing disposition of the LED package 22. Electrical leads 54 power the LED chip 22.

Figure 5D:
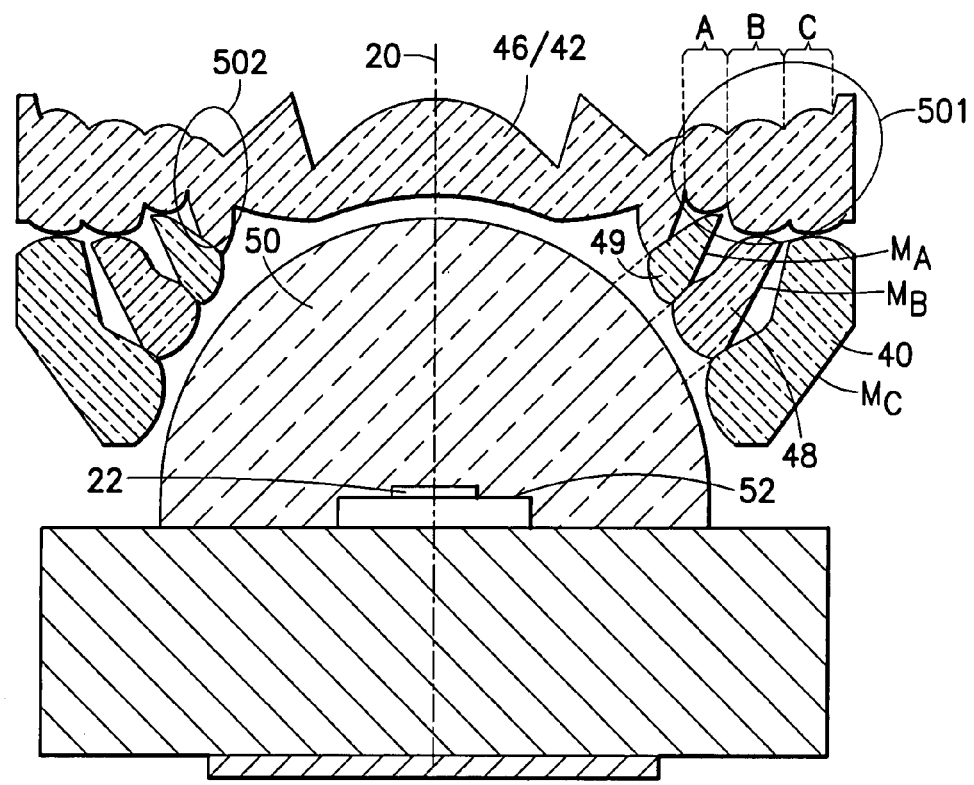

FIG. 5D shows another example of a LED illuminator of the invention. The illuminator consist of a Fresnel lens near the axis, a catadioptric mirror structure 502, and three imaging channels A, B and C. The upper portions 501 of the imaging channels are integrated into one component 46/42 with the Fresnel lens part and the catadioptric mirror structure 502 in order to ease the manufacturing. The lower portion of the imaging channel A is a distinct ray guide component 49. Note that the second ray guide 42 may be adapted in an embodiment to include such a central lens so as to span the optical axis 20, illustrated as 46/42 in FIG. 5D. In this case the second ray guide 42 is no longer toroidal, but functions nearer its outboard portions to image across imaging surfaces $T_3$ and $T_4$, for multiple channels so as to interface with the imaging surfaces $T_2$ of each of the first toroidal ray guide 40, the third toroidal ray guide 48 and the fourth toroidal ray guide 49, substantially as detailed above.

Figure 5E:
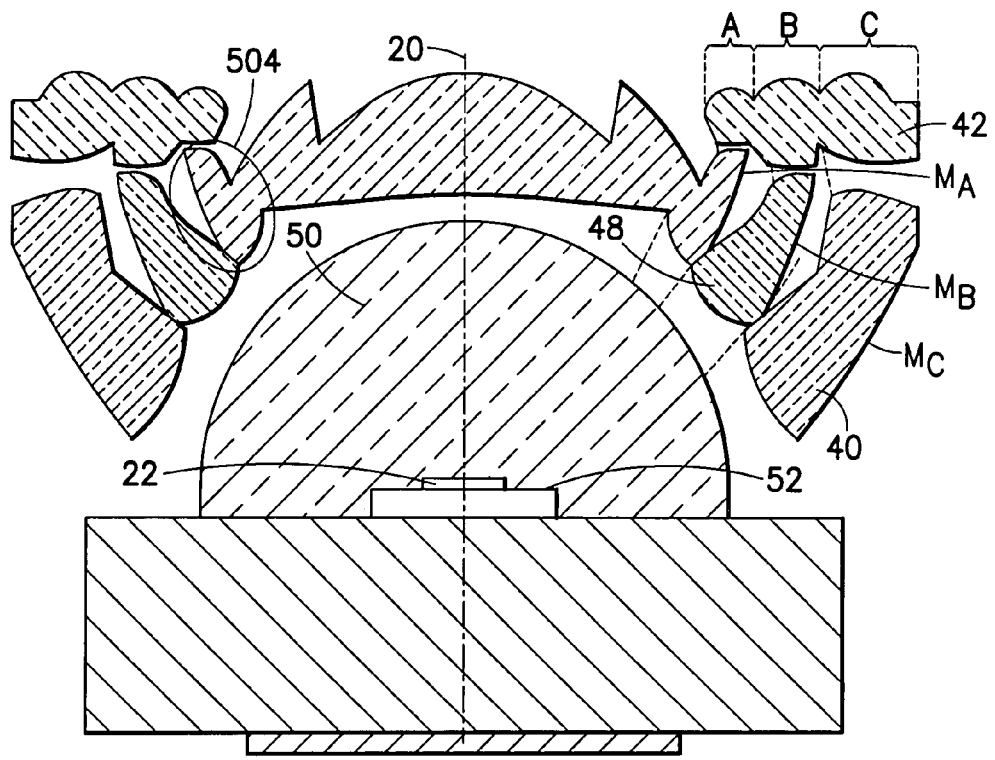

FIG. 5E shows still another example of a LED illuminator, which has a Fresnel lens near the axis and three imaging channels A, B and C further from the axis 20. The lower part 504 of the centremost channel A is integrated with the Fresnel part, and the upper parts of all three channels are integrated together into one ray guide 42. Note that the mirror surface $M_A$, $M_B$ and $M_C$ of each channel A, B, and C has a curved shape, i.e. it is taking part of imaging the entrance pupil of the channel to the intermediate image, which is located approximately between the lower 504, 48, 40 and the upper 42 part of the channels.

Figure 6A:
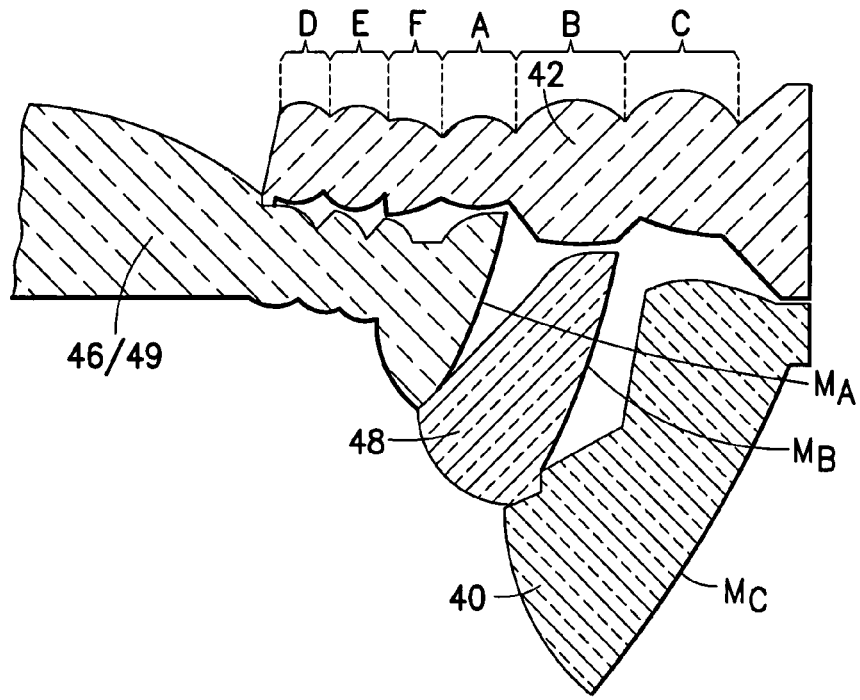
FIGS. 6A-6B illustrate another embodiment of an illuminator.
Figure 6B:
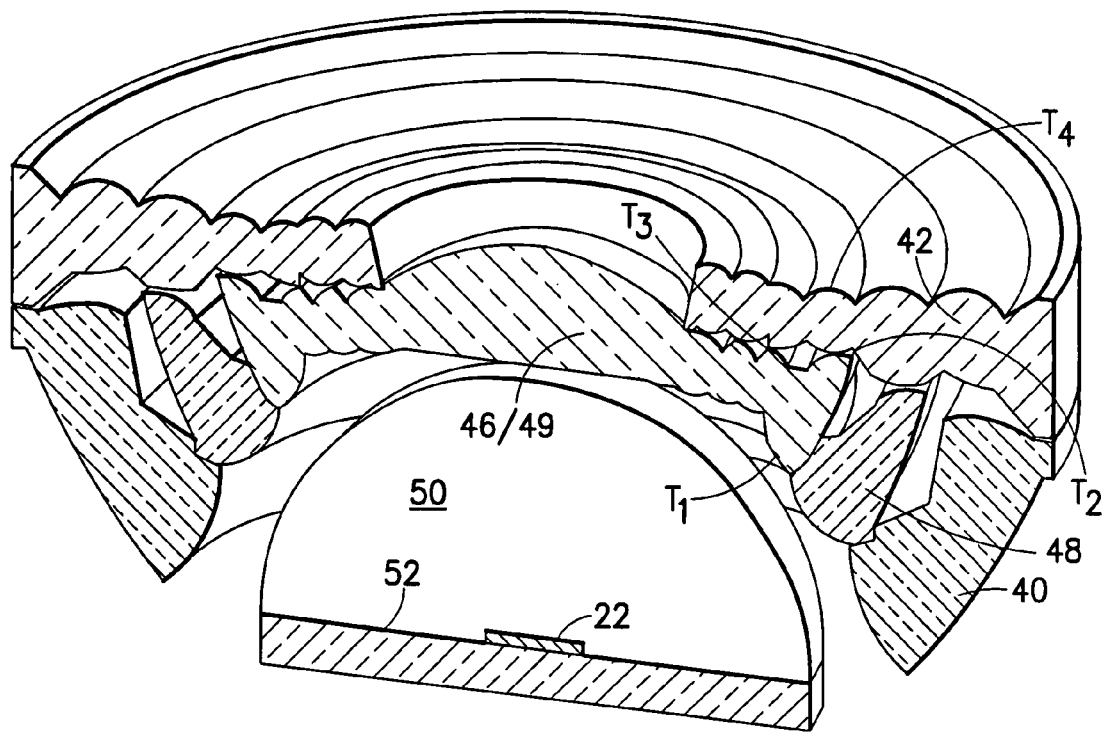

FIG. 6A shows a cross-section of still another illuminator that is to scale (units are millimeters). FIG. 6B shows the same in perspective view above a LED chip 22 with dome 50. This illuminator has a lens near the axis, followed by three imaging channels D, E and F without mirror surfaces and three imaging channels A, B and C with mirror surfaces $M_A$, $M_B$ and $M_C$. The whole illuminator consist of only four parts which are possible to mass-manufacture very cost effectively. The components further have support and alignment features for assembly purposes. FIG. 6B shows in perspective view the illuminator 58 of FIG. 6A. The third ray guide 48 has an entrance pupil and second surface not unlike those described for the first optical channel 40. As can be seen essentially all light entering the entrance pupil of the third ray guide 48 pass through that third ray guide 48 and are redirected through its upper surface $T_2$ toward the lower surface $T_3$ of the of the second ray guide 42. The other ray guide 46 is a combination; at the outboard edges it forms part of optical channels and in the central area nearest the optical axis 20 it is a conventional lens structure. As can be seen various combinations of channel portions and lenses may be combined into a singular manufactured component or divided into several such components.

Figure 6C:
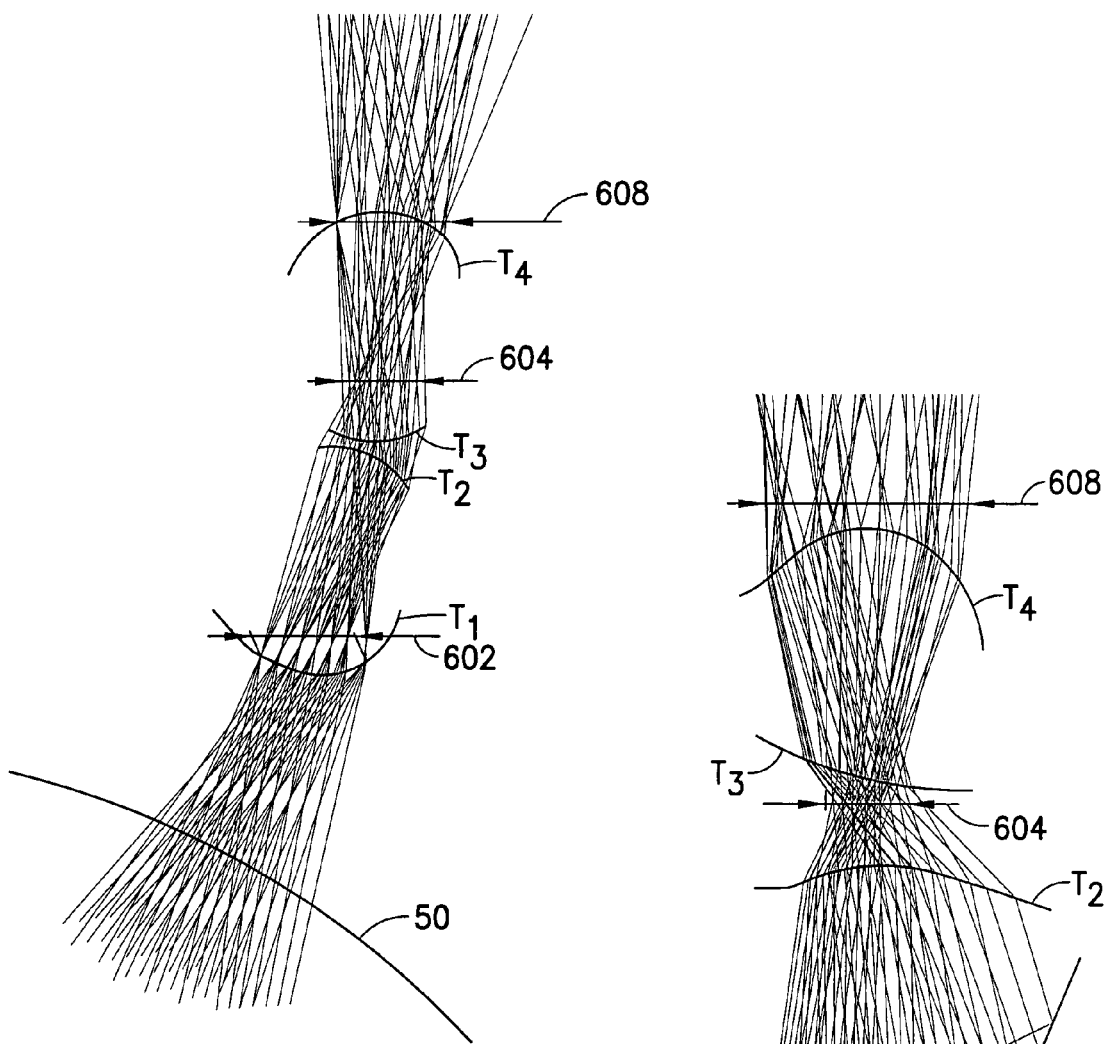
FIGS. 6C-6D illustrate ray tracings through optical channels of the illuminator of FIGS. 6A-6B.

FIG. 6C shows a radial cross-section of the centremost imaging channel D of FIG. 6A-B with ray tracings. The channel has four guiding surfaces (in addition to the dome 50, which can be interpreted either to be a part of the channel or not to be depending on the source definition), which substantially form an mirror image of the source 22 to infinity in each radial cross-section plane, and which substantially forms a non-mirror image of the source into infinity in the tangential direction. The rays show the imaging in the radial cross-section planes. The first surface $T_1$ substantially images the LED chip 22 into the intermediate image 604, which is then substantially imaged by the surface $T_4$ to the infinity. The surfaces $T_2$ and $T_3$ substantially image the entrance pupil 602 of the channel into the exit pupil 608 of the channel C. All the surfaces from first to the fourth are aspherical, i.e. the cross-sections are not arcs of circles. Aspherical surfaces generally gives more degrees of freedom than arctual surfaces in the design optimization and therefore may give better performance inside the design constraints, such as manufacturability and cost matters.

Figure 6D:
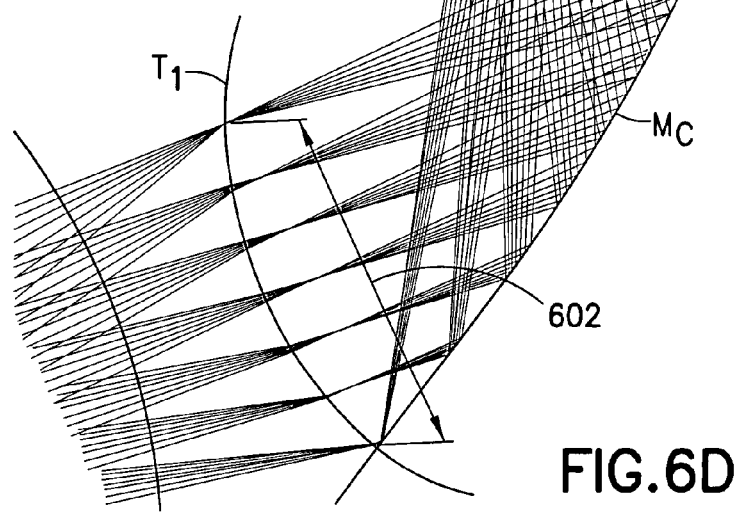

FIG. 6D shows a radial cross-section of the outermost imaging channel C of FIG. 6A-B with ray tracings. The channel C has five guiding surfaces (in addition to the dome), which substantially form a mirror image of the source to infinity. The first surface $T_1$ and the mirror surface M substantially image the LED chip into the intermediate image 604, which is then substantially imaged by the surface $T_4$ to infinity. The surfaces $T_2$ and $T_3$ substantially image the entrance pupil 602 of the channel into the exit pupil 608 of the channel. The mirror surface M reflects the rays by total internal reflection. All these five surfaces are aspherical.

Figure 6E:
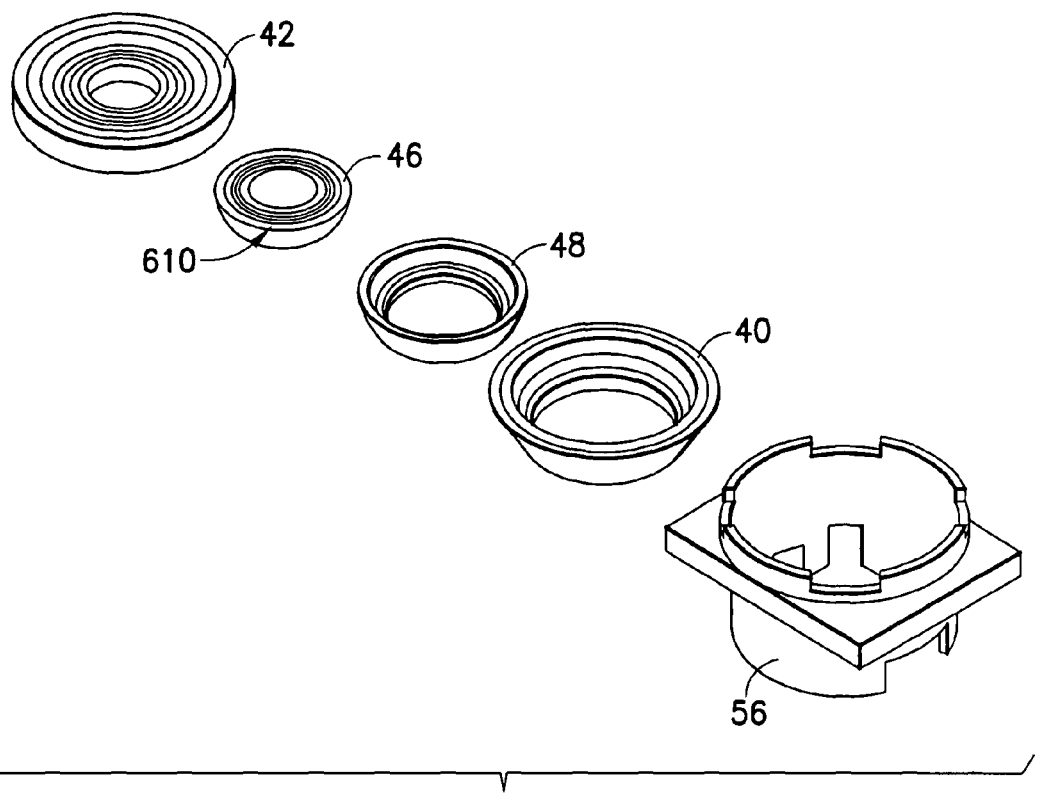
FIG. 6E is an expanded view of the illuminator of FIGS. 6A-6B.

FIG. 6E is an exploded view of FIG. 6B, showing a housing 56 in which are disposed the parts of the illuminator shown in FIG. 6E. Note that when assembled as shown a portion of the additional optical channel, which is the lens type structure 46 at the central portion, has outboard of that lens a lower part 610 of the imaging channel structure next to the lens.

As can be seen various combinations of channels and lenses may be combined into a singular manufactured component or divided into several such components.

Figure 7A:
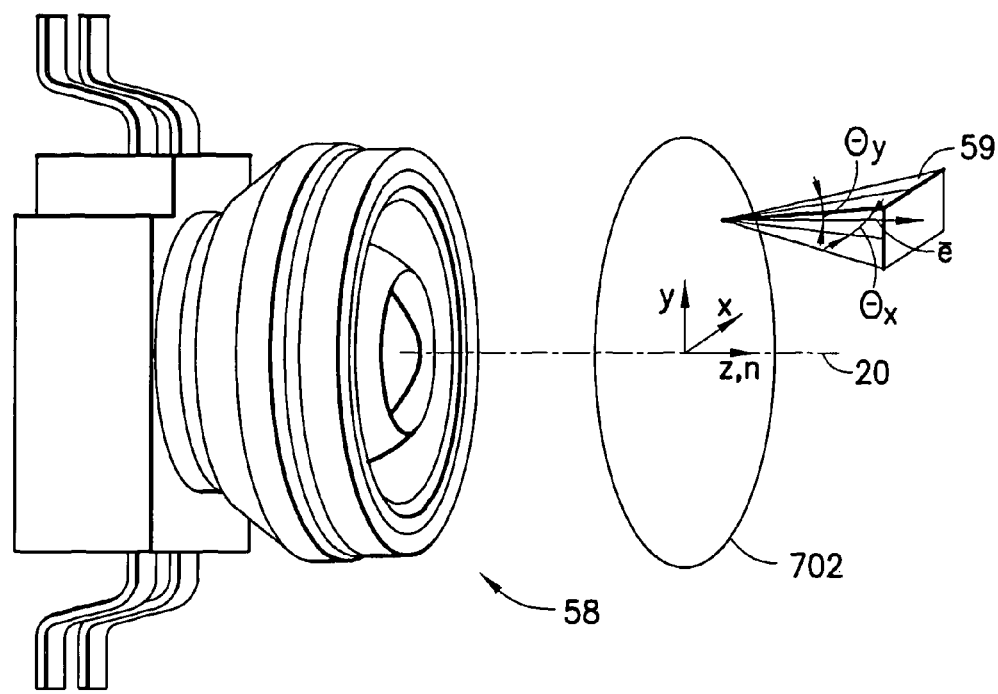

FIG. 7A shows the completed apparatus 58 in the context of the mathematical construct of FIGS. 2A-B. Light from the LED source 22 along the optical axis is redirected from those larger angles from the optical axis (e.g., 40-90 degrees, or 40-140 degrees as will be shown, or more particularly 45-90 degrees) to an average direction approximately parallel to the optical axis 20. Additionally, the circularly symmetric illumination output from the rectangular LED chip 22 is converted to substantially rectilinear uniform illumination as seen by the cone 59 of FIG. 7A. Each point at the illuminator output plane 702 has a similar rectangular illumination cone 59. The rectilinear uniform angular distribution pattern is defined by the angles $\theta_x$ and $\theta_y$, which mean the half opening angles of the rectilinear cone 59 in the x and y directions. If the source 22 would not be rectangular but for example a circle or triangle instead, the illumination cones 59 would have a corresponding shape.

The illuminator 58 detailed above has spatially a circular output light emitting area, which ensures a good pupil matching with the projection lens. Ideally the illuminator will be positioned in the illumination pupil of the projection optical engine. Now, let the diameter of the illuminator output be D. A rectangular light "cone" 59 is defined by angle alpha $\alpha$ as shown in FIG. 7B. The illuminator design allows adjustment of the output diameter D and the cone 59 angle alpha $\alpha$. For a source 22 of a certain size, D are inverse proportional to each other according to the etendue law (see U.S. Pat. No. 7,059,728). In an embodiment of the invention the source is rectangular LED chip 22 with dimensions of 0.93 mm×0.93 mm×0.1 mm, the diameter D is 7.5 mm, and the collected solid angle has 80 degree half angle, and the alpha $\alpha$ is 10.7 degrees. There is no upper limit seen for D, but as noted above it is preferable to minimize the optical engine size.

Generally, the built embodiments of the invention followed the relative proportions of FIG. 7C; the diameter of the illuminator output plane 702 adjacent to the surface $T_4$ is about twice the distance h between the LED 22 and that output plane 702. So, the light collection and beam shaping is made in a space, whose diameter is determined by the desired half-opening angle of the beam according to the etendue law, and whose height above the light source 22 is approximately half of the diameter, as seen in FIG. 7C. However, the height could be longer as well.

FIG. 7D illustrates how the illuminator can be used for illuminating in a projection optical engine. At the LED chip 22, the beam is spatially rectilinear because that is the shape of the chip itself, but angularly the illumination from it is circular. The illuminator 58 reverses the distributions so that the output from the illuminator 58 is spatially circular but the illumination angular distribution is rectilinearly uniform as will be seen in the intensity plots below. At a micro-display 72 the spatial distribution of the illuminated area is rectilinear but the angular distribution is circular. That matches perfectly to the lens 74 entrance pupil, which is spatially circular. So, the illuminator 58 provides a solution for projection engines, where the pupils are matched throughout the whole system.

The imaging channel concept provides numerous advantages. The same design may be used with different shaped and sized LED chips 22 by scaling the design when needed. The same design may be used with different sized domes 50 around the LED chip, too.

The alignment between the LED chip 22 and the dome 50 in existing LED packages may be so inaccurate that it would affect to the performance of the illuminator 58 if not compensated by accurate alignment of the LED inside the illuminator. Another solution is to use an extra (second) dome 50' around an existing LED dome 50, and index matching gel or glue 82 between them in order to avoid LED chip alignment problems. The extra dome 50' can be aligned precisely to the LED chip or package. Another reason for using the extra dome 50' could be the use of the same LED illuminator 58 with smaller LED domes 50 than it was originally designed.

The number of the channels can be varied from one to tens, or even more for larger profile devices. The more the channels the more precise is the rectangular illumination, but the cost is more difficult manufacturing. However, by proper optimization of the channel designs, and by using aspherical surfaces as described above, it is possible to obtain substantially accurate imaging function.

Figure 8:
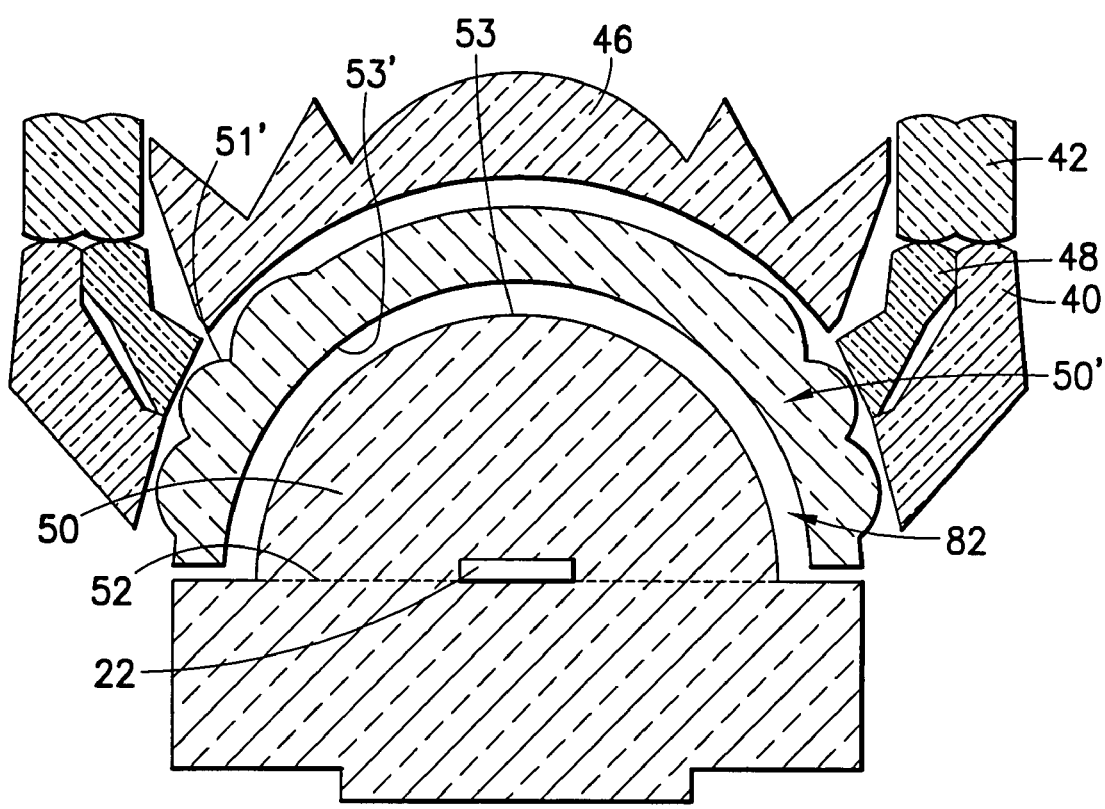
FIG. 8 shows an embodiment where a functional surface from FIG. 4A is moved from a channel to an extra dome.

Also, if using an extra dome 50' around an existing LED dome 50 (which forms the surface S) it is possible to incorporate the function of the first surface $T_1$ of the imaging channels partially or fully to the outward facing surface 51' of the extra dome 50', as in FIG. 8. There, an extra dome 50' has an inward facing surface 53' that matches a surface 53 of a commercial LED chip 22/dome 50 combination. An index-matching gel or glue 82 bonds the two so that light from the LED 22 is manipulated by the outer surface 51' of the extra dome 50' to allow simpler manufacturing of the ray guides 40 and 48 about the periphery and in line with the extra dome 50'. Note that in FIG. 8 the surfaces of those ray guides 40, 48 facing the extra dome 50' and its outward facing surface 51' are more planar than they were in embodiments without the extra dome 50' (see FIG. 4A), since the functional shaped surface $T_1$ is on the outward facing surface 51' of the extra dome 50'.

Figure 9A:
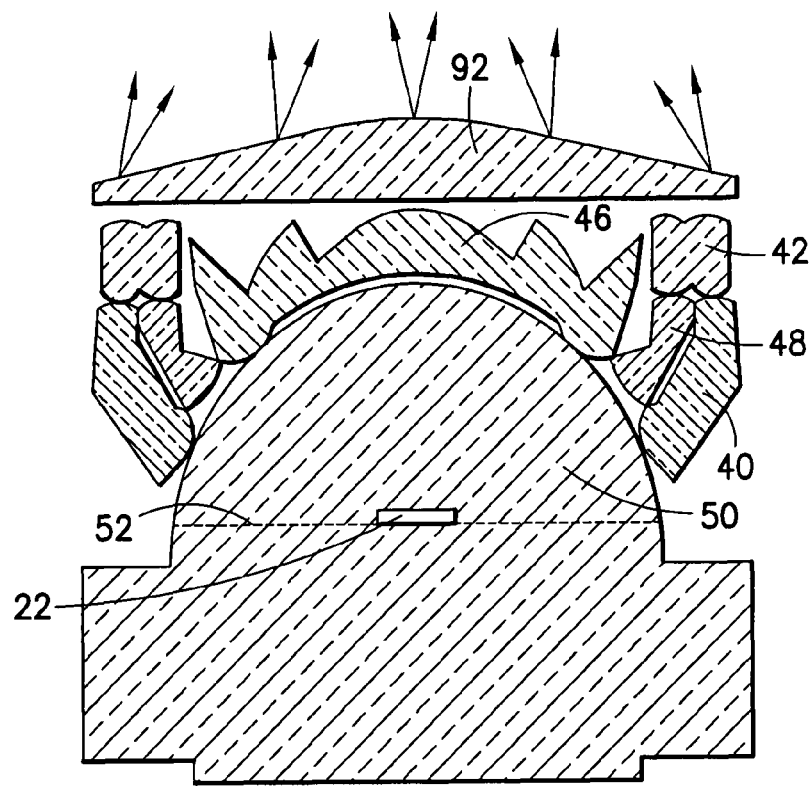
FIGS. 9A-B illustrate how a relay lens might be incorporated functionally into surfaces of the optical channels according to an embodiment.
Figure 9B:
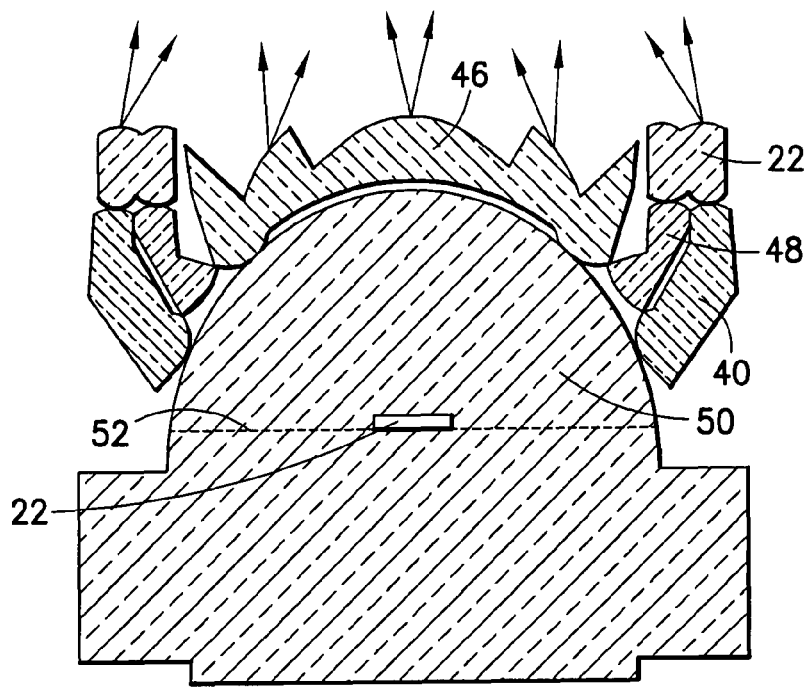

If the optical channels and the overall illuminator 58 is designed for telecentric output, the cones 59 radiate perpendicular to the output plane (i.e. an extra relay lens 92 is needed to turn the light cones to coincide for example at the micro-display 72 as shown in FIG. 9A). The channels and illuminator 58 can also be designed for non-telecentric illumination so that no extra lens is needed. The relay lens function can be incorporated to the uppermost surfaces of the illuminator 58, specifically the outermost facing surfaces of the channels as is shown in FIG. 9B. The last surface $T_4$ of the channel can be modified so that the beam is tilted towards the axis 20, or further away from the axis 20 as desired. In some applications it might be desirable to vary this tilt a bit as a function of radius. This can also be implemented by modifying the ray guide design. For example, it is possible to decrease the angle alpha $\alpha$ gradually as one moves from the center of the illuminator output plane 26 towards the edges. That may be beneficial in very low F-number/F-stop systems. Such a modification can be made by slightly departing from the rule of equal radius described above so that the deviation is function of radius, however keeping the principles otherwise the same.

Sometimes it would be wise to design and manufacture the component to have telecentric output and then position a relay lens 92 just after the component in order to convert the beam to non-telecentric, so that only the relay lens 92 need to be changed if telecentricity needs to be changed, and the ray guides or illuminator 58 need not be replaced with another of a different design. If telecentricity needs to be tuned so that the tuning is different in different radial output zones, a separate ray guide just after the illuminator can be used which has a suitable refractive surface angle in each zone. Such ray guides are easy to manufacture by diamond turning for example If the light source is not uniform and we would like to achieve a uniform image, we can apply a smoothing effect which makes the illumination more uniform by designing a different angular "magnification" to different zones of the channel output. Also we can modify the beam shape differently in different zones of the component output and that can also be used to smooth the illumination. These approaches implement the smoothing at the cost of increased etendue or increased losses, and departing from the accurate imaging function.

One way to smooth the illumination is to incorporate a difference in magnification in radial and tangential directions in certain or all zones of the illuminator output. That smoothes the image tangentially (i.e. cylindrically) by a desired amount and in the desired zones only. This also is at a cost of increased etendue or losses. The tangential magnification can be adjusted by adjusting the distance of the channel entrance and exit pupils from the axis of revolution (20) of the cylindrically symmetric ray guides, i.e. departing from the rule of equal radius purposefully. The radial magnification can be adjusted by adjusting the magnification of the 2d-optical system of the radial cross-section plane of the channel.

The channels have the capability to create rectangular illumination with uniform intensity distribution and sharp edges. Sometimes that result is not the most desired illumination form; sometimes it is desired to have brighter illumination at the center of the rectangular illumination and dimmer illumination at the corners. But for some applications the desired output can be opposite; a dimmer center and brighter corners. Any of these illumination results can be implemented by using the abovementioned smoothing and adjusting approaches. Still another way to smooth the illumination, is to use both mirroring and non-mirroring channels in the same illuminator component, as was also described above.

A fly's eye lens can be used with the illuminator 58 in order to add additional homogenization to the beam, or make very sharp edges for the illumination, or to change the aspect ratio of the rectangular illumination. The illuminator forms a good input to the fly's eye lens because the illuminator preserves the etendue of the beam. If the fly's eye lens does not change the overall shape of the beam formed by the illuminator (i.e. the rectangular shape), but only fine tunes such as homogenizes the beam, the etendue and the flux of the beam can be preserved in large extent also after the fly's eye lens.

It is possible to vary the size of the rectangular radiation pattern across the circular output of the device 58. For example in miniature projection applications one might desire to have the size of the radiation pattern decrease slightly when going from the center of the circle towards the edges. This option can be implemented by having the radius of the circular area A a bit larger than the radius of the hemisphere S, and modifying the transformation accordingly.

The shape of the illumination of the illuminator matches the xy-shape of the source. This means that the rectangularly shaped illumination is formed by using the rectangular shape of the LED (i.e. the LED is practically imaged so that the entrance pupil of the illuminator covers the whole hemisphere). Because the overall device 58 images the shape of the light source 22 to the illuminated plane, the channels and ray guides can be designed to form illumination of any shape defined by the light source 22 (for example, circular, elliptical, triangular, rectangular, square etc.) In a projection application, the illuminator output plane should preferably be placed at the illumination pupil of the rest of the optical system however not limited to that placement.

The source 22 need not to be planar as in the above examples. Even if the source has a non-negligible height, the imaging channel concept described herein can be used.

Of course it is not mandatory to collect all the light from the source 22. For example, sometimes it is advantageous to collect only part of the source light, i.e. the brightest area from the source. Or sometimes it not advantageous to collect the whole hemisphere. If one does not wish to collect the whole hemisphere, for example in the case that the rest of the optical engine can not handle such a large etendue, one can collect only the desired part of the hemisphere by using the same concept. For example, one might want to collect light at angles only between 0 and 70 degrees from the optical axis z, or one may elect to collect light from only angles between 0 and 80 degrees instead of the full hemisphere 0 to 90 degrees.

For example, if one desires to collect the light at angles only between 0 and 50 degrees, it may be implemented by a Fresnel lens near the axis and one imaging channel with mirror surrounding the Fresnel lens. Or sometimes one might want to collect light at angles from 45 to 90 degrees only, in the case of which the component may be implemented without the central lens or Fresnel part by three imaging channels with mirror for example.

Figure 10:
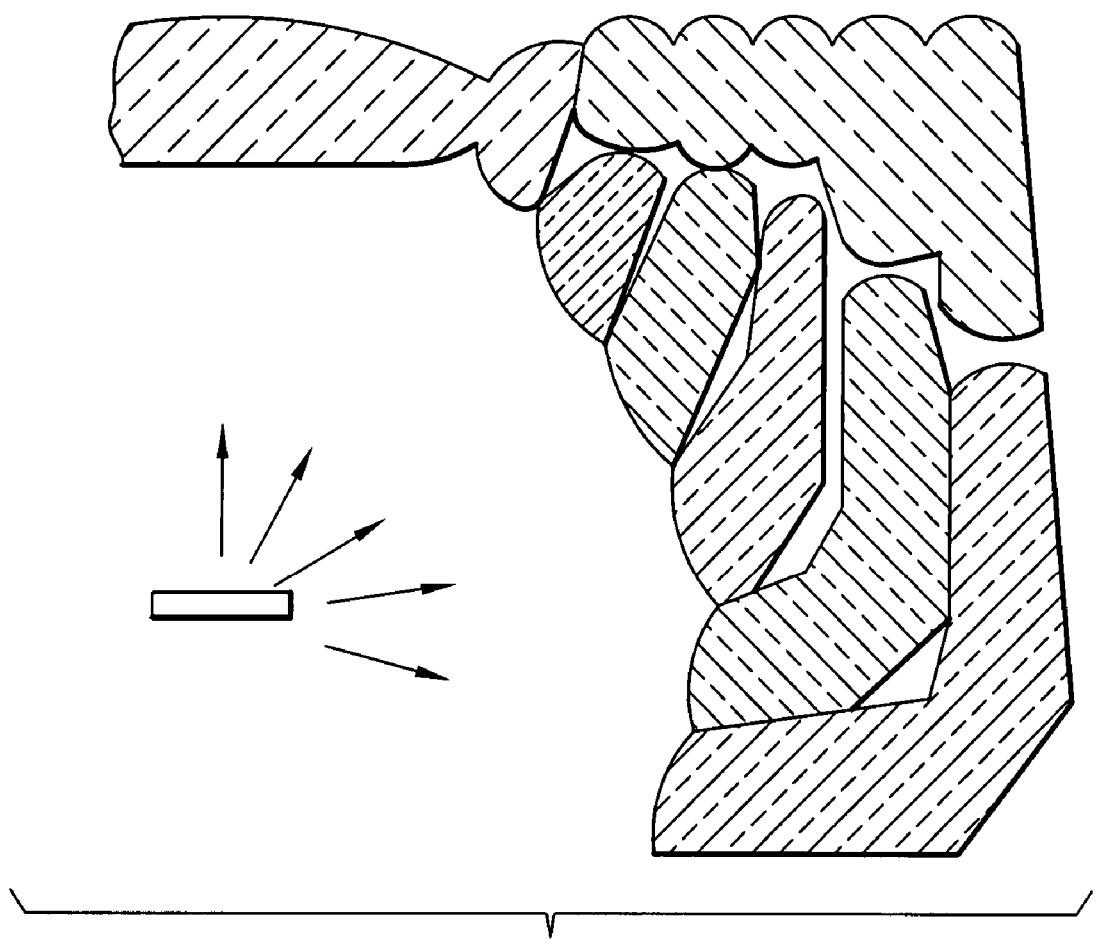
FIG. 10 illustrates ray guides forming optical channels adapted to image at angles greater than 90 degrees according to an embodiment of the invention.

It is also possible to collect the light emitted to larger solid angles than a hemisphere. By using the imaging channel structures defined herein, it is possible to collect light from 0 to nearly 135 degrees also. See for example FIG. 10. However the accuracy of the image starts to deform as the collection angles increase beyond 90 degrees, because the tangential magnification starts to decrease from what would be required for good imaging properties. However, no other approach is seen to image at angles 40-140 degrees from the optical axis, and particularly at 45-135 degrees from it. The imaging beyond 90 degrees can be implemented when the source is encapsulated with a material having an index of refraction greater than one, near 1.5 for example.

The imaging channels are not limited to surfaces which are cylindrically symmetric over a full 360 degrees. An example is shown in FIG. 11, which is fully working imaging or illumination device being cylindrically symmetric and covering a 90 degree sector around the axis of rotation.

Figure 11:
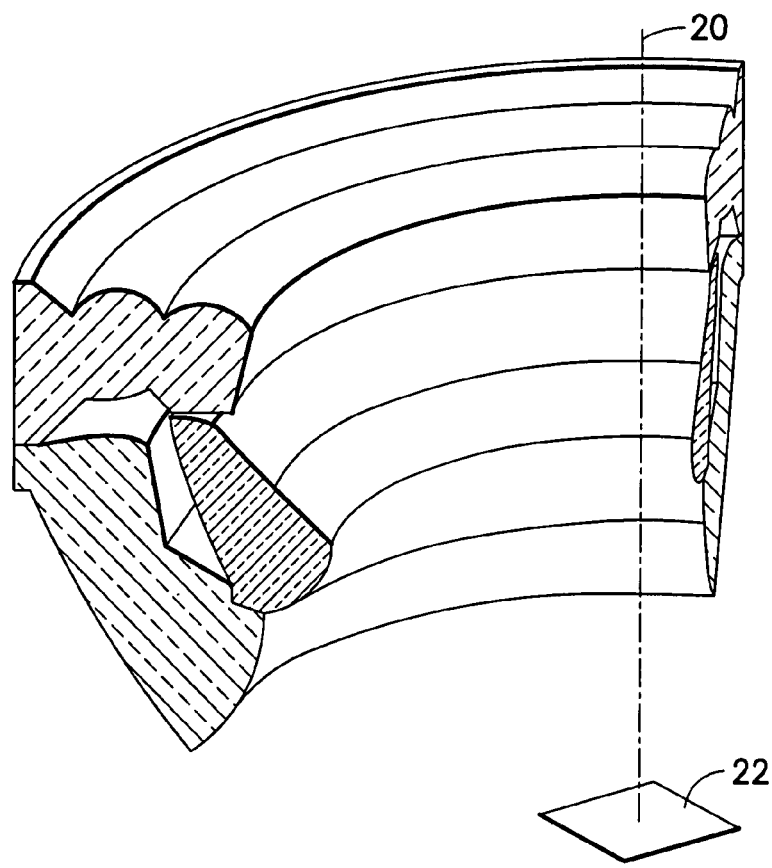
FIG. 11 illustrates a 90 degree section of a circularly symmetric ray guide arrangement according to an embodiment of the invention.

The cylindrically symmetric imaging channels may be assembled from parts that each form only a portion of the imaging channel, which can be for example a sector of the channel as in FIG. 11.

Still another embodiment of the imaging channels is composed of two or more non-cylindrically symmetric ray guides, which together form a substantially cylindrically symmetric imaging channel. Circles can be approximated by several straight line segments. So the circles may consist of for example 20 straight lines approximating a circle. Similarly, a cylindrically symmetric ray guide can be approximated by a ray guides which consists of planar surfaces. In the other words, the cross-sections of the imaging channel perpendicular to the axis of rotation, instead of being smooth circles, could be a piecewise linear approximation of a circle, in such a way constructed as imaging channels.

Figure 12:
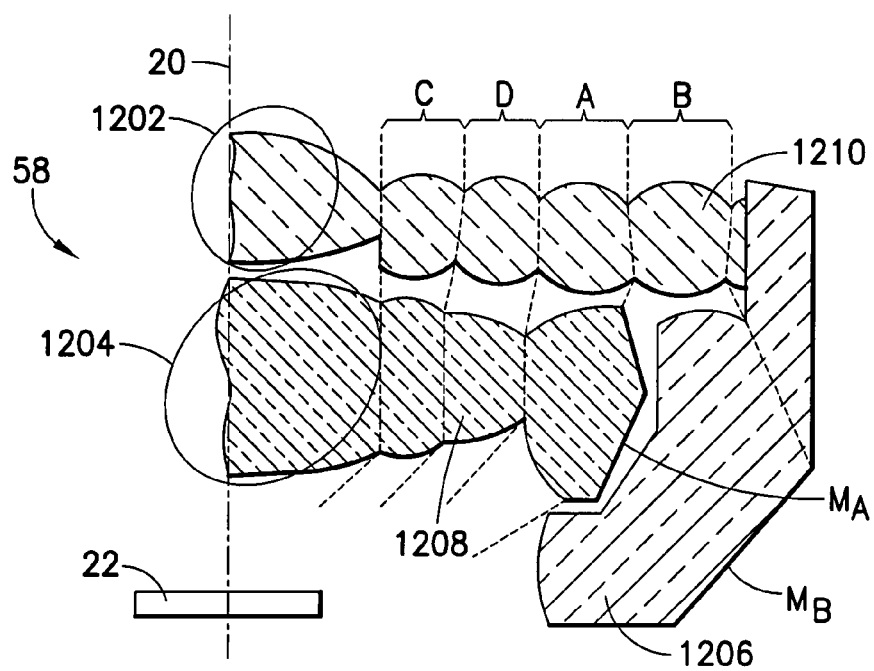
FIG. 12 illustrates a sectional view of a simple illuminator made from only three ray guides and forming four optical channels according to an embodiment of the invention.

Although some of the abovementioned examples were described by supposing that the object to be imaged, i.e. the source, is encapsulated inside a higher refractive index material (i.e. n>1) the invention is not restricted to such sources. If the source is surrounded by air, the described ray guides and channels would work as well and in a similar fashion. Because the etendue of such a chip is smaller it eases the optimization and allows very cost effective components to be manufactured. One example of such solution is shown in the FIG. 12. The illuminator 58 includes a two lenses 1202, 1204 near the axis 20, two imaging channels C, D without mirror surfaces, and two imaging channels A, B with mirror surfaces $M_A$, $M_B$. The whole illuminator consists of only three distinct parts, ray guides 1206, 1208 and 1210. The lower part of the outermost channel B forms an assembly support and housing of the whole illuminator 58.

When the source is surrounded by air, it is possible to reduce the amount of needed channels by adding an approximately hemispherical lens (which typically is an aspherical lens, i.e. dome) close to the source 22 but so that there remains a small airgap 1302 between the source 22 and the dome 50, as shown in FIG. 13. The dome with airgap will benefit from the smaller etendue of the non-encapsulated source 22 and guide the light from almost a whole hemisphere inside a smaller cone, which can be even 40 degrees depending on the index of refraction of the dome and the distance between the dome and the chip, and dome geometry. In that case, it is possible to image light emitted to almost the whole hemisphere with the central lens (or Fresnel lens 46 such as shown in the FIG. 13) together with only one A or two channels, which simplifies the overall system.

The arrangement of the imaging channels is not limited to just the visible optical wavelength region of the electromagnetic radiation spectrum. These imaging channels can be applied to non-optical wavelength regions also such as ultraviolet, infrared, microwave, and radio wavelengths, for example. Further, the imaging channel concept is not limited to electromagnetic radiation only, but it can be used as well for other radiations such as for example electron beams. Radiation can be modelled in physics as rays, which means an idealized narrow beam of radiation. Rays can be used to model both propagation of waves, such as electromagnetic radiation waves, or streams of particles such as the electrons. In general then, the described optical channels may be considered as beam-shaping channels, and the incident light may be generalized as incident radiation from the described angles. The system optical axis may be referred to as such even if the radiation being shaped is not within the visible light range.

The use of the imaging channels are not restricted to small millimetre scale ray guides as will be shown below with solar concentrators. The needed size of the ray guides would depend on the application and their diameter can be even smaller than millimeter, or be several centimeters or even tens of meters in diameter, however not limited to that.

The best manufacturing method for the imaging channel components depend on the used radiation and the application. For optical wavelengths and in small scale the ray guides can be manufactured for example by using direct diamond turning of plastic. Suitable materials for the components of the invention in the visible band are for example cyclic olefin copolymer (COC, such as TOPAS®), polymethyl methacrylate (PMMA), polycarbonate (PC), and polystyrene (PS). The ray guides that form the imaging channels can be efficiently mass-manufactured by using injection molding. The optical surfaces for the mold can be machined on Nickel for example by using diamond turning. The ray guides can be assembled together inside a cylindrical tube, similar to typical lens assemblies.

Larger scale implementations using Fresnel lenses may be desirable from a cost perspective. Fresnel lenses can be molded from plastic and they can be assembled together by using a frame which maintains the ray guides in their correct location relative to one another.

The ray guides can also be made from glass, instead of plastics. Glass tolerates much higher temperatures than plastic materials, which may be important in some applications.

As with most of the optical systems, the same optical system can be used in both directions. Similarly also the channels can be used in both directions. Object described above can be image and the image can be the object. FIGS. 14A to 14D show as examples how the imaging channels can be combined with the lens and Fresnel lens components for high-NA relay system.

Figure 14A:
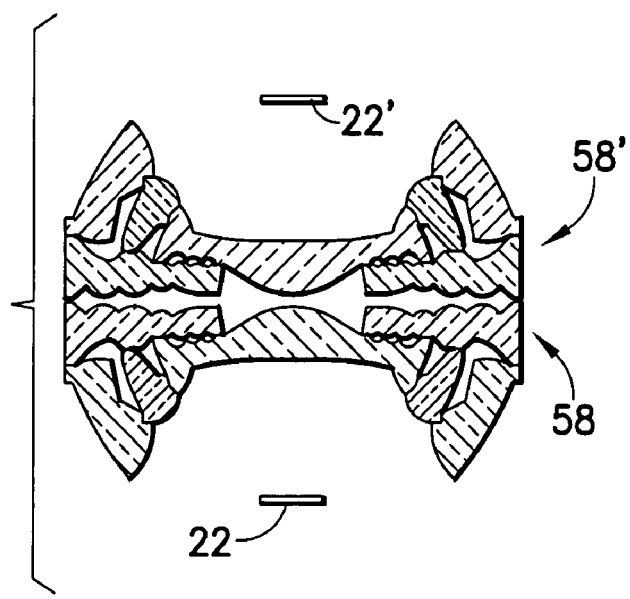
FIGS. 14A-D illustrate various embodiments for magnification purposes and reverse optical direction.

FIG. 14A shows a relay system which has unit magnification. It consists of two illuminators 58, 58' against each other. The first illuminator 58 collects the light from the source object 22 and creates a telecentric output, which the second illuminator 58' concentrates to the image 22'. That is suitable illumination configuration to be used for example in microscopes, as shown in FIG. 15A.

Figure 14B:
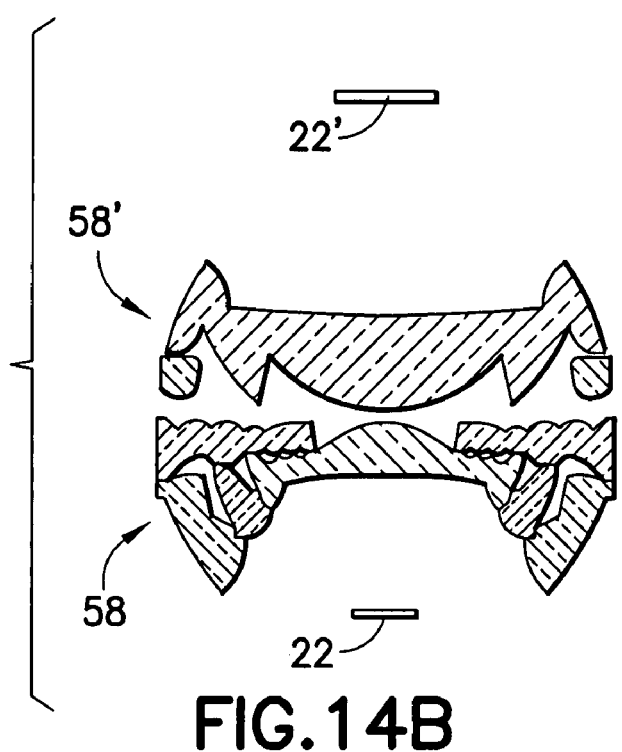

FIG. 14B shows a relay system with 1.6× magnification (bottom to top), or, 0.625× magnification when it is used in opposite direction. The idea is the same as with FIG. 14A but the second illuminator 58' is larger and so covers smaller solid angle about the image than a hemisphere.

Figure 14C:
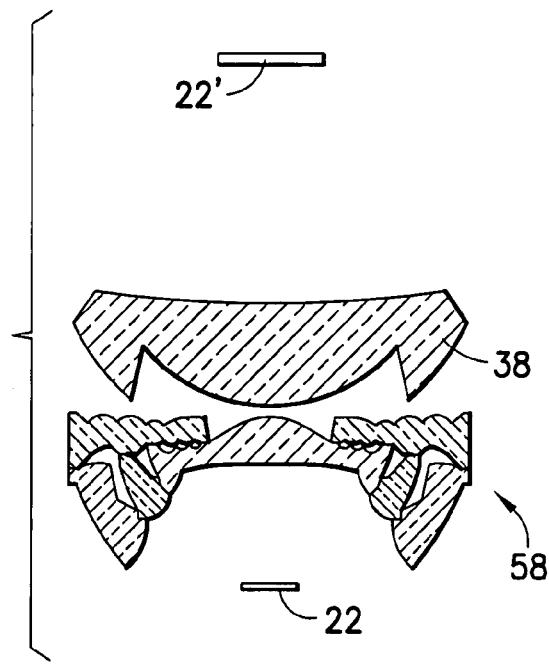

FIG. 14C shows a relay system with 2× magnification, or, 0.5× magnification when it is used in opposite direction. It has only one illuminator 58, together with a Fresnel lens 38. The Fresnel lens 38 could as well be replaced with a lens system for example, but a Fresnel lens provides a compact size.

Figure 14D:
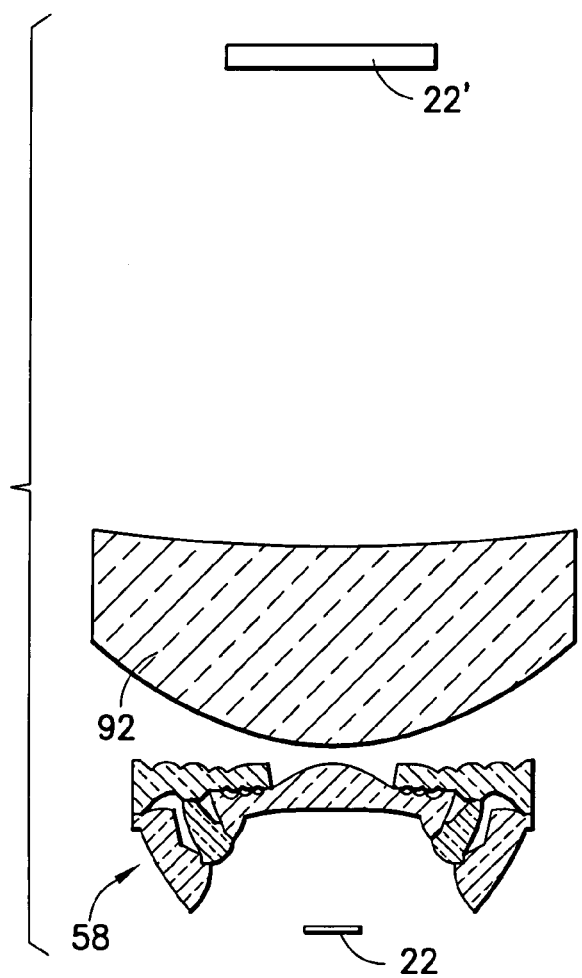

FIG. 14D shows still another relay system with 4×, or 0.25×, magnification. The illuminator 58 is combined with a relay lens 92. That is suitable illumination configuration to be used for example in micro-projectors.

In FIG. 15A light is collected from a light source 22 by using one illuminator 58, then light is concentrated to a very bright spot by using another illuminator 58' (e.g., mounted in reverse of the first).

Figure 15B:
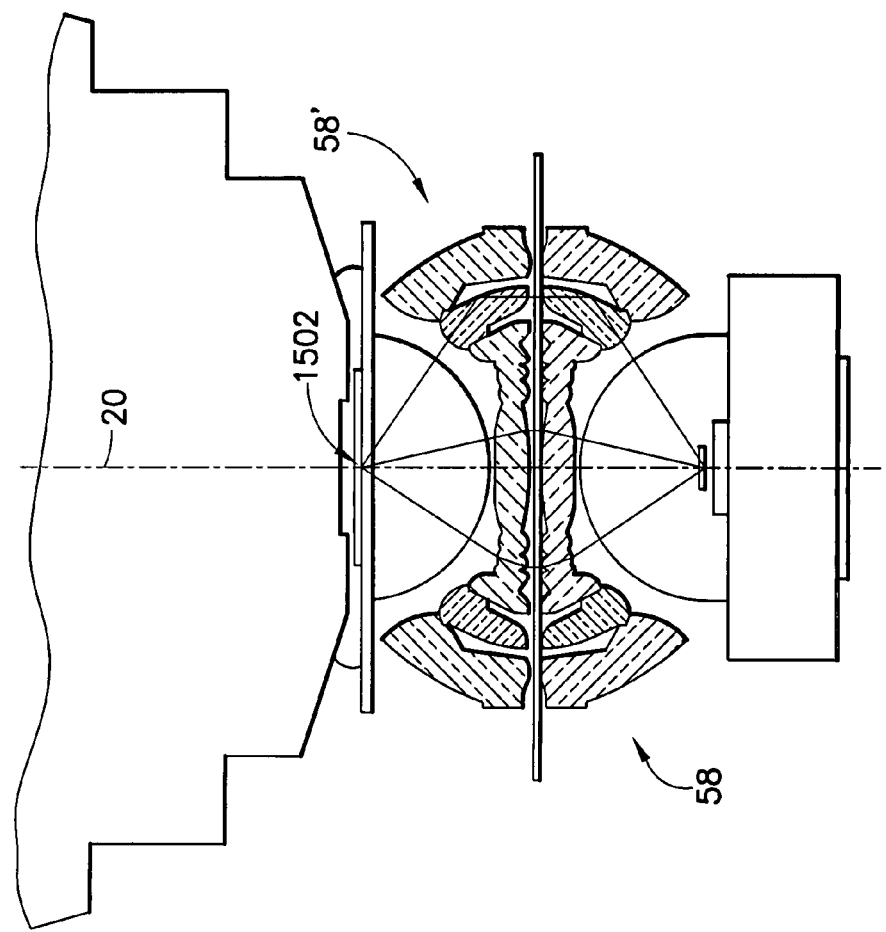
FIGS. 15A-C are schematic diagrams of two embodiments of the invention adapted for use with a microscope.
Figure 15A:
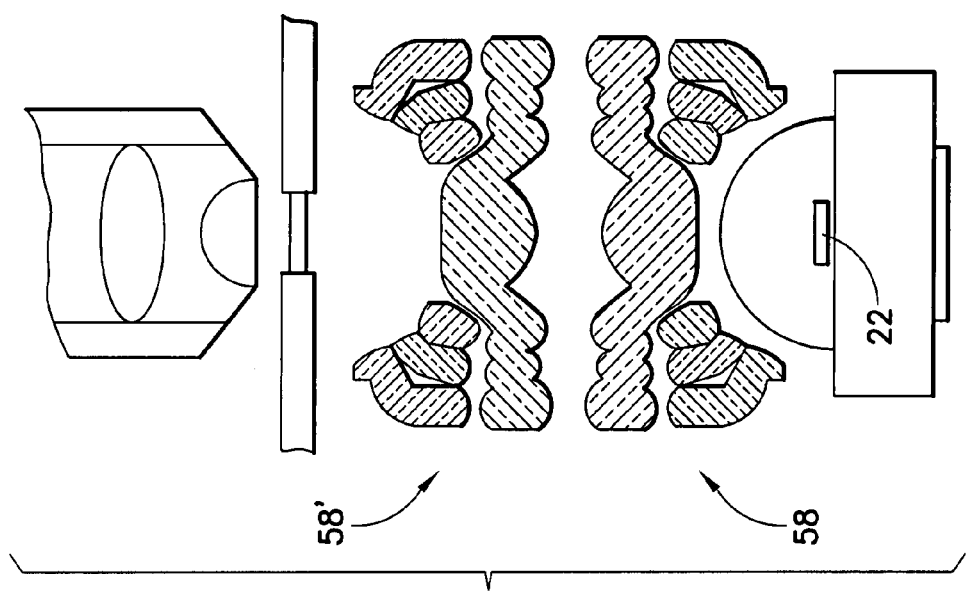

FIG. 15B shows an embodiment of the invention, which is a relay system with unit magnification, corresponding to FIG. 14A and FIG. 15A, but in simpler configuration. By the teaching of the invention, the intermediate image formed by the channel (in radial cross-section planes) is imaged to the image. This imaging of the intermediate image to the image can as well be made with similar kind of structures, that is used to create the intermediate image. If the intermediate image is designed to be telecentric in angular distribution, it is possible to use the exact copy of the ray guides forming the intermediate image to form the image from it in unit magnification. FIG. 15B has the intermediate image between the upper and lower portions of the channels. The upper and lower portions of the channels are similar but against each other. This embodiment provides very efficient illumination for micro-scope as shown in the FIG. 15B. The illuminator is capable of fully filling the etendue of the specimen by using one LED chip. Note that when oil-immersion is used in the microscope, this illumination provides a great advantage in that it is capable of by using one LED filling the whole etendue of the specimen 1502 inside the high refractive index material.

Figure 15C:
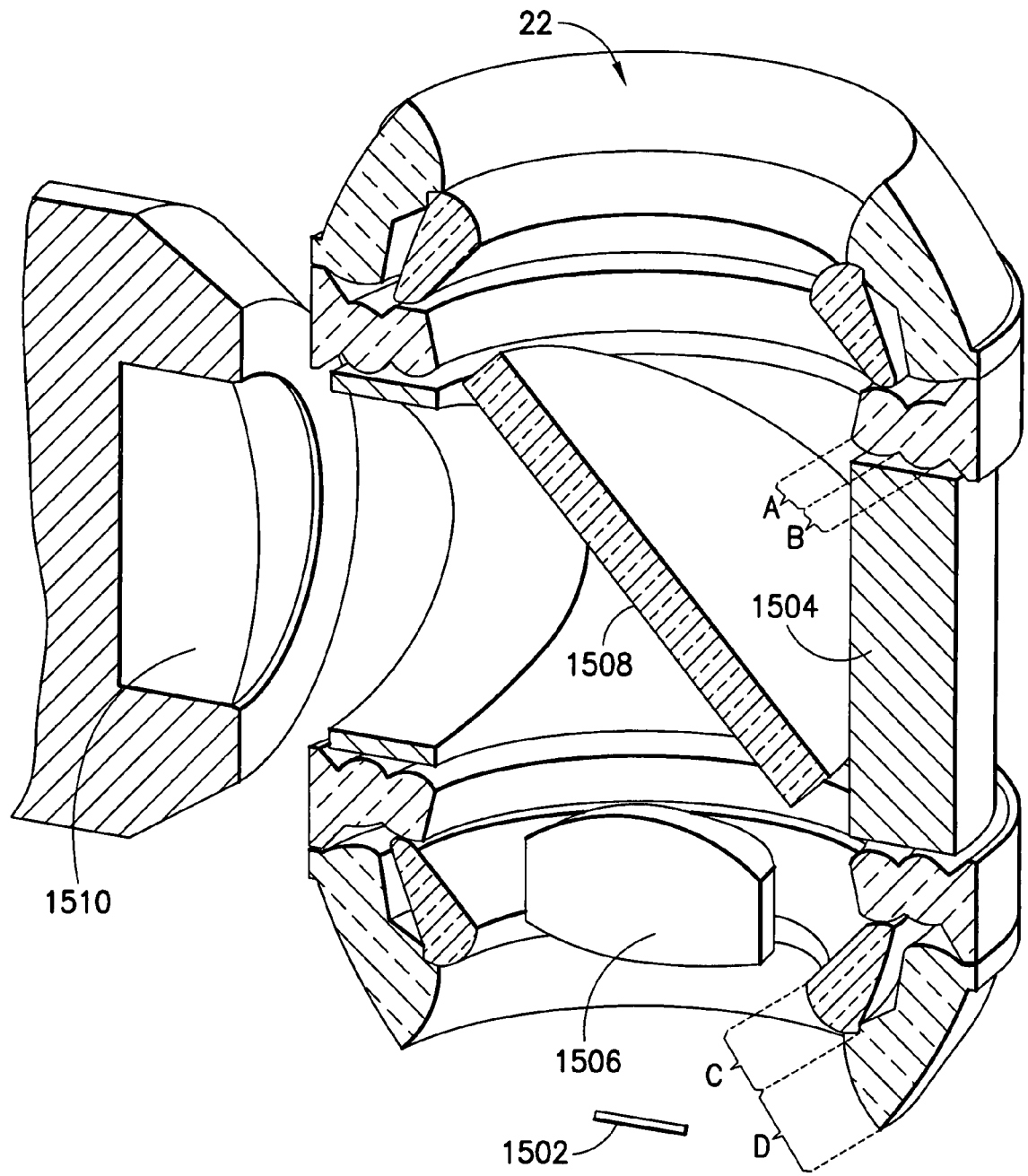

Light redistribution using at least one ray guide as detailed above can be used to create an illumination quality image of a source 22 when a center area (direct path, along the z axis 20) is blocked. This is beneficial in some systems. For example, microscopy illumination from the object side is shown in FIG. 15C. Light is collected from a light source 22 by using two imaging channels A and B, then guided through a cylindrical light guide 1504 to another two imaging channels C and D which concentrate the light to a spot on the specimen 1502. Then by using a first objective lens 1506 and a mirror 1508 and the rest of the objective lens 1510, the light is imaged to a camera or eye. The cylindrical light guide 1504 could as well be replaced with one or more toroidal lenses to achieve the same functionality.

Another application is as a retinal imaging camera. In retinal imaging, the area near the optical axis is typically blocked by the imaging optics and illumination needs to be brought to the retina by using the area further from the optical axis. In that kind of case the imaging channels can be used in similar fashion that was presented for the microscopy illumination from the object side. However, not only the imaging optical axis can be reflected by using the mirror, but as well the configuration can be designed so that the illumination path is turned to coincide with the imaging optical axis by using a ring-shaped tilted mirror.

Solar dish generators are the most efficient of all solar technologies with respect to solar to electricity conversion efficiency. These systems use an array of parabolic dish-shaped mirrors to focus solar energy onto a receiver, which is located at the focal point of the parabolic reflecting concentrator. The receiver can include photovoltaic cells to capture the solar energy directly into an electrical form. Typically in high power applications, the receiver includes a working fluid such as oil or water which is heated to several hundreds degrees Celsius and used to generate electricity in an engine, which can be for example a steam engine or more preferably a Stirling or Brayton cycle engine. The dish concentrator needs to be directed accurately towards the sun so it needs to track the sun when the sun moves in the sky. Such solar dish generators have several drawbacks:

- The efficiency of the solar dish generator is proportional to the concentration ratio of the parabolic concentrator. However the concentration efficiency of a paraboloid of revolution is not at the maximum theoretical concentration efficiency and can be improved, which would increase the efficiency of the solar generator.
- The radiant flux at the receiver, achieved by using the existing parabolic concentrators, is far from the maximum because the numerical aperture of the beam at the receiver is limited. Were it otherwise the parabolic reflector would have to be very deep, a very difficult mechanical arrangement
- The receiver in these prior art systems needs to be above the reflector, which means that it is difficult to access.
- The receiver needs to be moved together with the reflector when the system tracks the movement of the sun
- The cost is high due to the above complex mechanical arrangement One advantageous employment of the invention is to provide a solar concentrator for use with these solar dish generators, and which does not have these drawbacks. The advantages of such an arrangement include:

- The concentration efficiency is close to the maximum theoretical concentration efficiency
- The numerical aperture of the beam at the receiver can be greatly increased over those described above without increasing the height of the concentrator.
- The receiver may be located below the reflector, allowing easy access to the receiver for maintenance.
- The receiver can be stationary when the concentrator tracks the movement of the sun.
- Overall there is lower cost system due to the more simple mechanical structure Such an apparatus may be manufactured as follows. The object to be illuminated can be the photovoltaic cell for example, which converts the light energy to electricity directly. The heat element (which absorbs light and converts it to heat) can also be some liquid such as water or oil for example, and electricity may be formed by using a turbine generator. Such an apparatus offers the following advantages. The component is capable of fully filling the etendue of the object inside the liquid even when liquid has a higher refractive index than air. The component allows space around the heating element so that no optical surfaces need to be near the highest intensity area. For example, the fluid can be inside a hemispherical dome, an analogy being the dome around a high efficiency LED source as seen at FIG. 8. Other conversion systems can be used like a Stirling heat engine or a steam engine for example. If the maximum concentration ratio is too high for the receiver object, the design of the component can be changed so that the spot which is created is larger than theoretical minimum, which eases manufacturing tolerances and sun tracking accuracy. Such a device can be used for solar-based heating systems, water warming, solar cooking, solar oven, and a solar electricity generating system (even up to the megawatt range).

Figure 16:
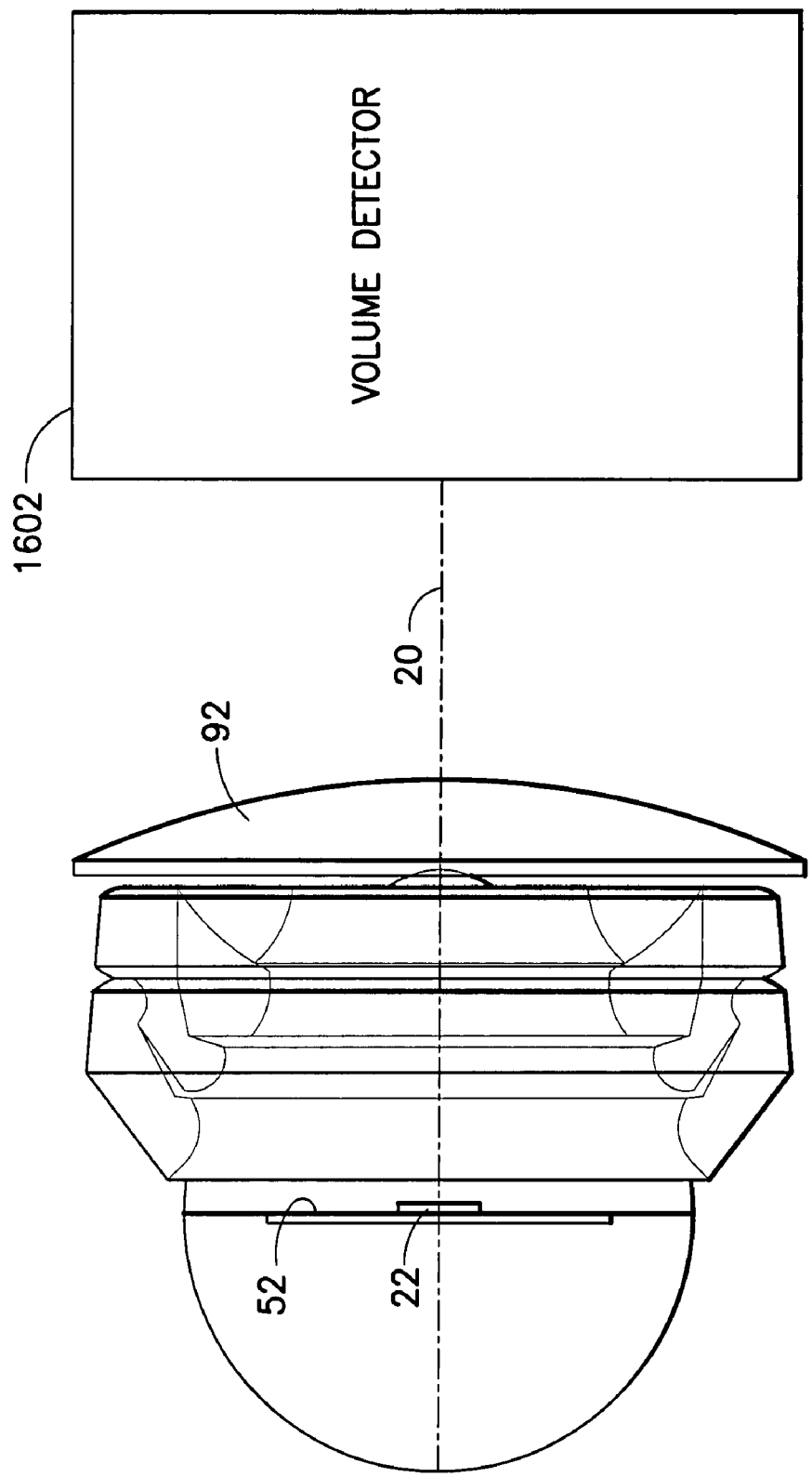
FIG. 16 is a model built according to an embodiment of the invention.

An embodiment of the illuminator as detailed above was tested by using Zemax optical design software. FIG. 16 shows the layout of the model. An LED 22 was mounted to a mirror 52 and disposed along an optical axis 20 opposite a target (volume detector 1602). A plurality of ray guides (similar to those shown at FIG. 5A) are disposed between the LED 22 and the target 1602, and a relay lens 92 was also disposed between the channel structures and the target. The optical channel structures were each circularly symmetric about the optical axis 20.

Figure 17A:
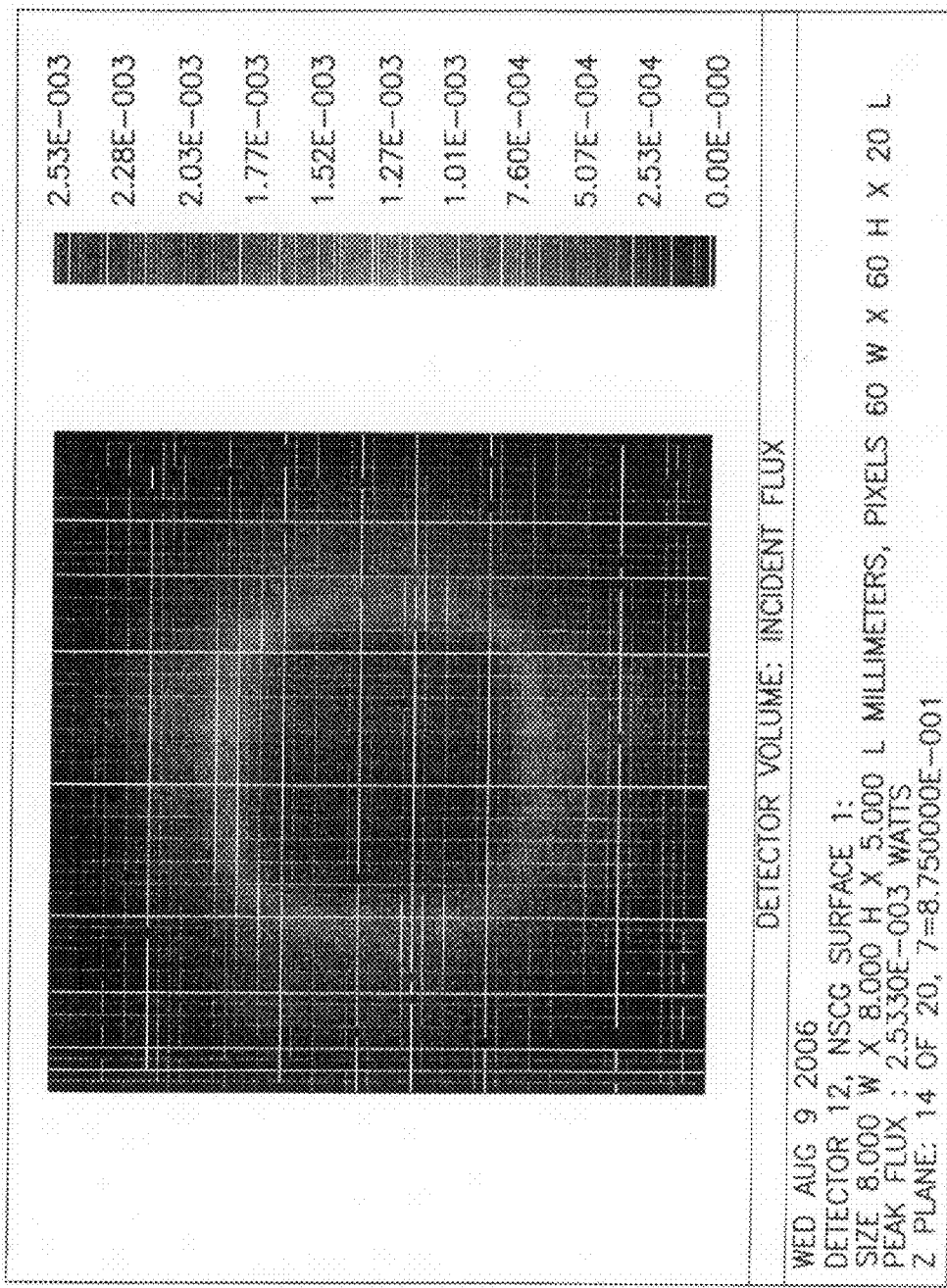
FIGS. 17A-B are illumination intensity patterns showing rectilinear uniform illumination from built models according to embodiments of the invention.
Figure 17B:
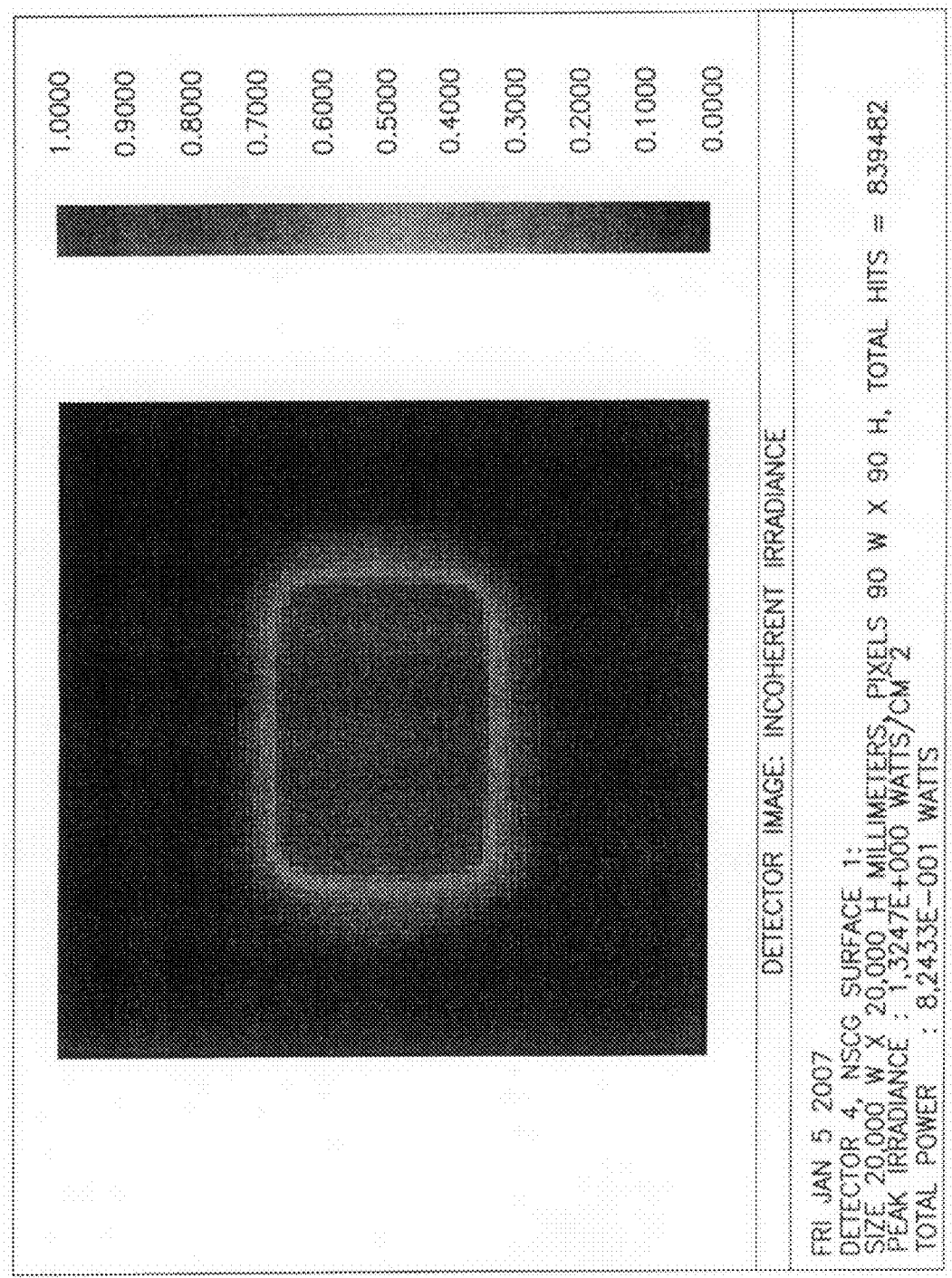

FIG. 17A shows the rectangular illumination at 11.5 mm distance from the LED chip 22 using the illuminator of FIG. 16. FIG. 17B shows rectangular illumination for an improved model of the same illuminator 58 with more precise channels. The sharpness of the rectilinear uniform illumination is quite noticeable, especially at FIG. 17B. The aspect ratio of the illumination is changed to 4:3 instead of square by having a biconic lens between the relay lens 92 and the target 1602.

According to the invention, an embodiment of the imaging channels A, B, C can be described as follows: An imaging channel images an object (light source for example) to the image (to the micro-display, to the specimen of the microscope, etc . . . ). the optical axis 20 of the whole device (illuminator/concentrator) is the same as the axis of rotation of the channels (and of the ray guides that form those channels). A radial cross-section plane is a plane such that the plane includes the axis of rotation. The radial direction is the x-axis of the radial cross-section plane, normal to the axis 20. The tangential direction is normal to the radial cross-section plane. Every radial cross-section of a channel contains a 2D-optical system (which is different than the channel optical system in the "tangential" direction). The optical axis of this 2D-optical system is the optical axis of the channel in radial cross-section plane. This is like a subsystem of the whole system. It is different than the optical axis of the whole component. The optical axis of the channel in a radial cross-section plane does not intersect with the axis of rotation of the channel between the radial entrance and the exit pupils of the channel. A radial entrance pupil of the channel is the entrance pupil of the 2D-optical system of the channel (i.e. in radial cross-section plane), which is typically approximately at the first surface of the channel (but not necessarily the same, see FIGS. 6C-D). A radial exit pupil of the channel is the exit pupil of the 2D-optical system of the channel (i.e. in radial cross-section plane), typically as approximately at the last surface of the channel (but not necessarily the same, see FIGS. 6C-D).

A radial cross-section of a channel has three functional parts (which can be integrated together) These three functions are designed into the channel, and are, in the below order from object to image:

1. Imaging the object to an intermediate image (in radial cross-section plane).
2. Imaging the radial entrance pupil of the channel into the exit pupil of the channel (in radial cross-section plane).
3. Imaging the intermediate image to the image (in radial cross-section plane).

All of these three functions may be embodied as toroidal optical ray guides. Typically functions 1 and 2 are embodied by ray guides whose 2D-cross-section at any radial cross-section plane has positive optical power. Function 3 can be embodied as a ray guide with either positive, negative or even zero optical power (typically it has positive power). Each function can be embodied as several optical surfaces, refractive, reflective or diffractive. Surfaces can be integrated together, too. Typically the best results are achieved by using at least one aspheric surface (i.e. an optical surface which does not have cross-section which is an arc of circle) per channel.

According to the teachings of the invention, an imaging channel is a cylindrically symmetric ray guiding component (which can consist of one or more distinct components, i.e. ray guides), whose purpose is to substantially form an image from an object. Of course the real parts which belong to an imaging channel apparatus can physically encompass other parts which are not cylindrically symmetric. Those portions of the imaging channel, which implement the imaging function are substantially cylindrically symmetric (e.g., a piecewise linear approximation as above is within the term substantially), and the other parts which do not implement the imaging function need not be.

Figure 18:
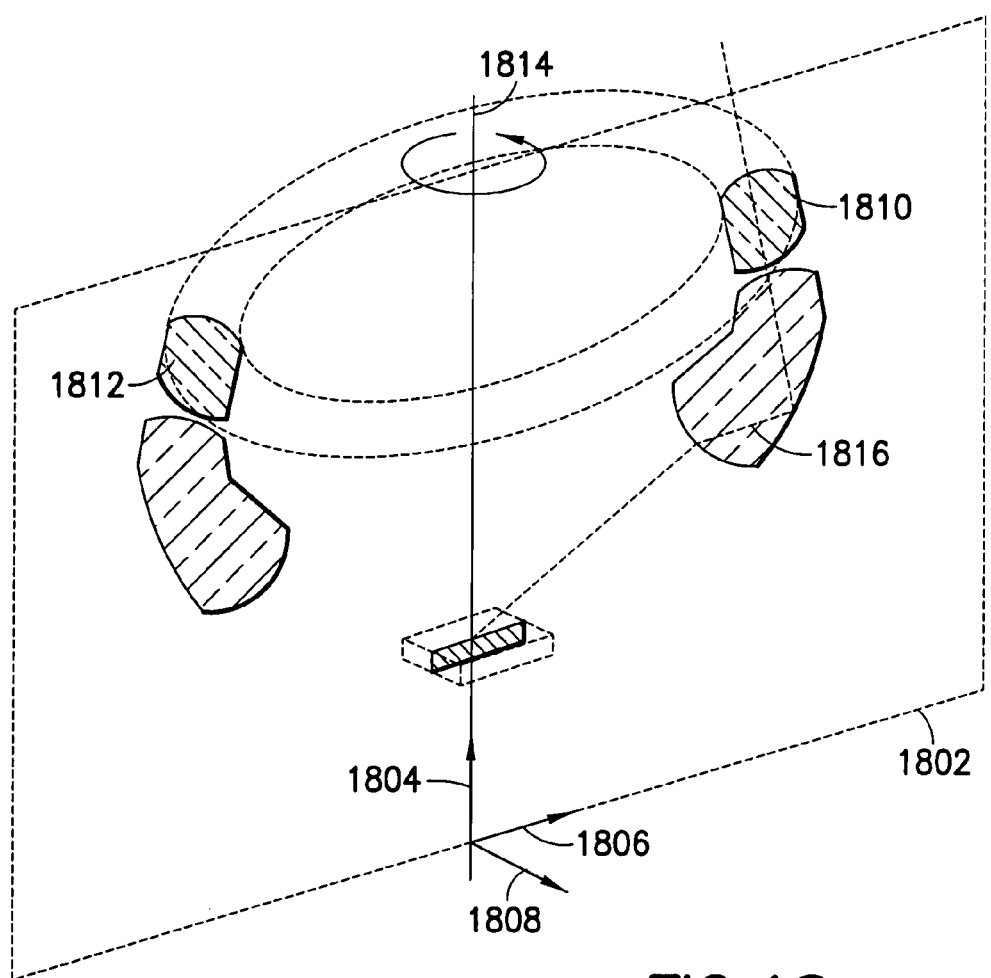
FIG. 18 illustrates a cross-sectional cut of an embodiment of the invention.

The substantially cylindrically symmetric imaging channel has a mean axis of revolution. The axial direction is defined to be the direction parallel to that axis of revolution. The radial direction is any direction which is perpendicular to the axial direction. The axial direction and any radial direction define a radial cross-section plane. The tangential direction is defined to be perpendicular to the radial cross-section plane. FIG. 18 shows a radial cross-section plane 1802 and the axial 1804, radial 1806 and tangential 1808 direction vectors related to it. The operation of an imaging channel can be described by using this coordinate definition.

In any radial cross-section plane crossing an imaging channel, the imaging channel defines a two dimensional ray guiding system 1810. It may also define two systems 1810, 1812 which are mirror systems in respect to the axis 1814 as shown in FIG. 18. That may happen when the imaging channel is cylindrically symmetric about the axis over more than 180 degrees. In the following description we refer to only one of these two dimensional ray guiding systems, i.e. for example to the right-hand-side system 1810 of FIG. 18. Note that the two dimensional ray guiding system has an optical axis 1816, which is not the same than the axis of revolution of the imaging channel 1814, but substantially different. Therefore the optical axis of the two dimensional optical systems are different for every individual radial cross-section plane.

The ray guiding components can be described by using substantially the same terms that are used typically in ray optics. Meridional rays mean the rays originating from the object along the radial cross-section plane. Typical optical systems have an entrance and an exit pupil. Similarly, each two dimensional ray guiding system has an entrance pupil and an exit pupil in respect to the cross-section of the object 1818 on the same radial cross-section plane. The entrance pupil can be a real or a virtual aperture that is defined such that the meridional rays going from the object's cross-section towards the aperture are guided through the two dimensional optical system. The exit pupil can be defined with similar analogy to the ray optics.

A specific feature of the imaging channel is that the meridional rays from the object are imaged by the two dimensional ray guiding system of a radial cross-section plane to an intermediate image on the same radial cross-section plane, and the intermediate image is further imaged to the image. In addition to that, the imaging channel characterized in that the intermediate image of the object does not cross the axis of revolution of the imaging channel, from which it follows that the intermediate images of the individual radial cross-section planes do not cross each other on the axis of revolution. Because of that and because the individual radial cross-section planes intersect only on the axis of revolution, the intermediate images of the individual radial cross-section planes can not cross each other anywhere.

This differs from the teachings of the existing collimation, beam shaping, and imaging devices, such as TIR-collimators or high-NA objectives for example. Those devices do not either form the intermediate image and image as described above, or if they form an intermediate image, the intermediate images of the individual radial cross-section planes cross each other at some location. That can happen for example when the optical axes of the two dimensional ray guiding systems of individual radial cross-section planes substantially coincide with the axis of revolution of the device.

These specific properties of the imaging channels together with other described specific properties of the imaging channels lead to great advantages of the invention as becomes apparent in this description.

According to the abovementioned imaging arrangement, the imaging channel forms an image of the object in every individual radial cross-section plane. How about the rays, which are not propagating in any radial cross-section plane, i.e. so called skew rays? Accurate tracing of skew rays through a cylindrically symmetric ray guiding systems is taught for example in Chapter 3 of the book "An Introduction To Ray Tracing" by A. S. Glassner, Morgan Kaufmann Publishers, $9^{th}$ edition, 2002. When a path of a skew ray is presented in a general (r,z)-coordinate system (i.e. horizontal axis denoted by r is the distance from the axis of rotation, and vertical axis is the z-coordinate), the paths of the ray follow sections of second degree curves instead of typical sections of straight lines. An important finding of the invention is that when an imaging channel is arranged so that the distances of the object points from the center of the entrance pupil of the two dimensional ray guiding system of an radial cross-section plane, are substantially larger than the distances of the object points from the same radial cross-section plane, the skew rays can be substantially treated as meridional rays when calculating the radial component of the skew ray through the imaging channel. It follows that if we project a skew ray incoming to the entrance pupil of an individual radial cross-section plane, along the tangential direction to the radial cross-section plane, and so obtain a meridional ray, we can trace the obtained meridional ray through the two dimensional ray guiding system, and so obtain the radial component of that meridional ray at the exit pupil. The magnitude of the radial component of that meridional ray at the exit pupil is now substantially the same as the magnitude of the radial component of the skew ray at its exit pupil. The accuracy of how well this approximation is true depends on the ratio of the abovementioned dimensions. For example when the distance of the object from the entrance pupil is approximately three times larger than the maximum width of the object, a good enough approximation is obtained for illumination quality images. So, the radial component of any ray on any individual exit pupil, both meridional and skew rays, is known and defined by the radial shape of the imaging channel.

From the arrangement that in each individual two-dimensional ray guiding system the imaging channel forms an intermediate image of the object and then further images the intermediate image to the image, it follows further that the imaging channel substantially images the entrance pupil to the exit pupil in each individual radial cross-section plane. The (full) entrance pupil of an imaging channel consist of all the points, which belong to some entrance pupil of some two-dimensional ray guiding system. Similarly the (full) exit pupil of an imaging channel consist of all the points, which belong to some exit pupil of some two-dimensional ray guiding system. Now, all points on the (full) entrance pupil are substantially mapped to a certain point on the (full) exit pupil. In other words, the entrance pupil is substantially imaged to the exit pupil.

In order to complete the imaging function for the skew rays, the imaging needs to be done also in tangential directions of the imaging channels. That is implemented in an innovative way by using the skew invariance property of the rotational symmetric ray guiding systems (look for example book "Nonimaging Optics" by Roland Winston, Elsevier Academic Press 2005, Chapter 10).

Figure 19:
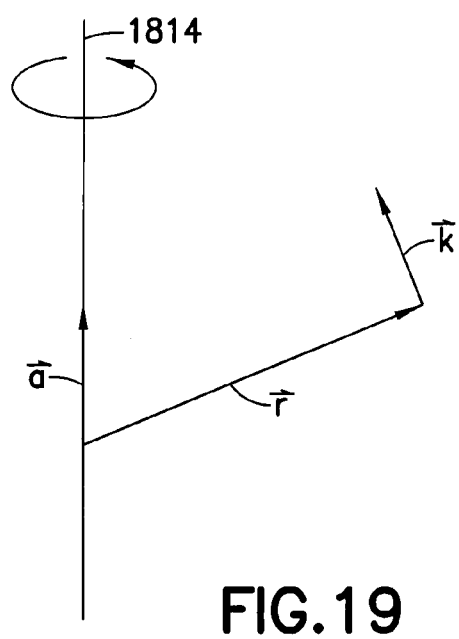
FIG. 19 illustrates a rotation axis with a ray vector.

The skew invariant (or skewness) of the ray is defined by $$s = \vec{r} \cdot (\vec{k} \times \vec{a}),$$

where $\vec{a}$ is an unit vector oriented along the axis of rotational symmetry, $\vec{k}$ is a vector of magnitude equal to the constant depending on the material where the ray is propagating (i.e. the index of refraction in optical radiation) and oriented along the ray's propagation direction, and $\vec{r}$ is any vector connecting the axis of rotation to the ray, see FIG. 19. The skew invariance states that the skew invariant of a ray is conserved in any rotational symmetric ray guiding system.

Figure 20:
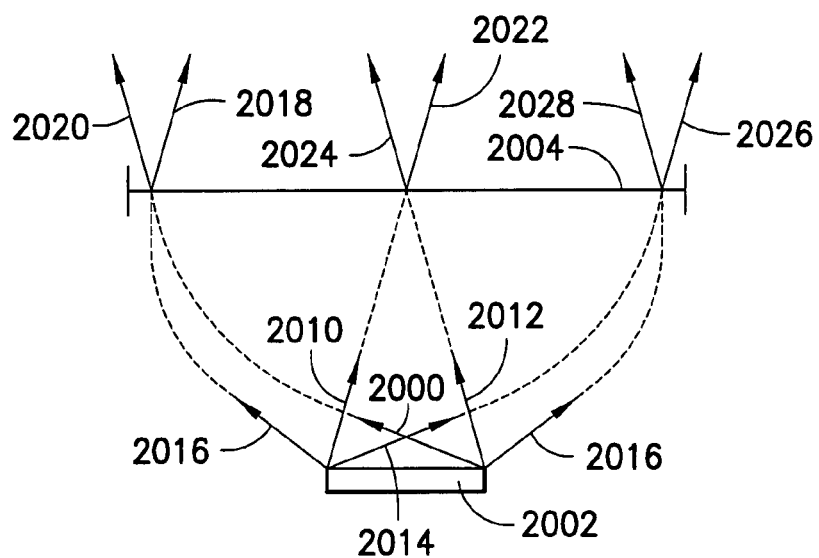
FIG. 20 illustrates a source and an illumination (exit) pupil.

Let us look any ray at the exit pupil of the imaging channel. Let the ray components in the axial, radial and tangential directions to be $\vec{k}_a$, $\vec{k}_r$, and $\vec{k}_t$ as shown in FIG. 20. Let the unit vector along the axial direction to be $\vec{a}$. Let the vector linking the optical axis with the ray be $\vec{r}$. Now the skew invariant of the ray is $$\begin{aligned} S &\equiv \vec{r} \cdot ((\vec{k}_t + \vec{k}_a + \vec{k}_r) \times \vec{a}) \\ &= \vec{r} \cdot (\vec{k}_t \times \vec{a} + \vec{k}_r \times \vec{a}) \\ &= \vec{r} \cdot \vec{k}_t \times \vec{a} = rk_t, \end{aligned}$$

where r is the distance of the ray from the axis of rotation at the exit pupil, and $k_t$ is the magnitude of the tangential component of the ray at the exit pupil. The simplification is possible because $\vec{k}_a \times \vec{a} = 0$ and $\vec{k}_r \times \vec{a} \perp \vec{r}$. The same calculations can also be made for the rays at the entrance aperture. There it follows that the tangential component of a ray at the exit pupil is related to the tangential component of the corresponding ray at the entrance pupil by the relation $$k_t = \frac{r'}{r} k'_t,$$

where $k'_t$ and $r'$ relate to the ray at the entrance pupil of the imaging channel. So, by adjusting the mapping from the entrance pupil to the exit pupil, the tangential components of the skew rays can be adjusted. Specifically, by that way, the tangential imaging can be matched to the radial imaging, and therefore the imaging function of the imaging channel is completed for skew rays, too.

A specific feature of an embodiment of the invention is that the entrance pupil is mapped to the exit pupil in such a way that the corresponding points at the entrance pupil and at the exit pupil have substantially the same distance to the axis of rotation. By using such embodiments of the imaging channel, it is possible to image rays emanating from an object to a whole hemisphere (or more) about the object.

The teaching of the invention describes an imaging channel component, which is capable of imaging an object to an image. The imaging channel can be designed to have different imaging properties in the radial and tangential directions. The degree of imaging can be adjusted separately in the radial and tangential directions. The imaging channel is able to substantially image an object from directions forming an angle from 0 to 135 degrees to the axis of rotation. That is because the imaging channel allows much more degree of freedom for arrangements of the ray guiding components than conventional imaging teachings. The imaging channel is made from cylindrically symmetric ray guiding components which is seen as an advantage for manufacturability point of view.

It is notable that implementation of an imaging channel needs guiding of the ray in three distinct locations at minimum, which of course can be implemented by one component too if it extends to these three distinct locations. Let the at least three ray guiding means be called the first, the second and the third ray guiding components.

It is also notable that the teaching of the invention is valid as well if an imaging channel, instead of forming one intermediate image in a radial cross-section plane, forms two or more successive intermediate images which are conjugates of each other and which are conjugates of the object and the image. That allows still more degrees of freedom how the path of the beam can be arranged. By that way, it is possible to have relatively long imaging channels which still have high NA per channel.

Still according to the teaching of the invention, an embodiment of the imaging channel of the invention is an apparatus comprising at least three ray guiding components which are substantially cylindrically symmetrical about an axis. Such ray guiding component can be any substantially cylindrically symmetric structure, which guides the rays by changing the direction of at least some of the rays. Such ray guiding component changes only those components of the direction vector of a ray, which components are perpendicular or parallel to the axis of revolution of the component (i.e. the components which are on the radial cross-section plane of the component), and does not substantially change the remaining component of the ray direction vector (i.e. the tangential direction vector in respect to the axis of revolution of the component).

In an embodiment of the imaging channel the entrance pupil is defined to be part of the physically possible entrance pupil. The object can be defined to be any source of rays, or a portion of it, or an image or virtual image of it, as described above.

Another way to describe the illuminator component described above follows: FIG. 20 shows a Lambertian source 2002 together with an illumination pupil 2004 above it. The source emits light into a large opening angle, for example into the whole hemisphere. Every point at the illumination pupil has angular distribution of light which creates an image of the source towards infinity. The image could be made to some other distance than infinity too, but here telecentric output is chosen just for an exemplary case. The width of the illumination pupil and the angular opening angle are related by the etendue law. This is the goal of the high-NA imaging, and also a goal of an ideal illumination system.

FIG. 20 further shows rays (2006, 2008, 2010, 2012, 2014, 2016) originating from the source and corresponding rays at the illumination pupil (2018, 2020, 2022, 2024, 2026, 2028). The problem is now how to design and create such an optical system that all the rays are guided to the corresponding rays at the illumination pupil at the same time (exemplary ray paths shown as dashed lines), and in 3D, whereas this figure shows only 2D-case. Many conventional solutions, for example high-NA lens systems try to solve this problem by handling all the rays by the same lens components. That causes several restrictions to the geometry what can be used and therefore conventional systems have not been able to implement well the abovementioned system without severe drawbacks, and especially when the source is inside material with higher index of refraction than unity. It is easy to understand that it is conventionally easy to get the central area working well but if we want to get the central area working and at the same time get the side-emitted light handled properly too, that is much more difficult.

Figure 21:
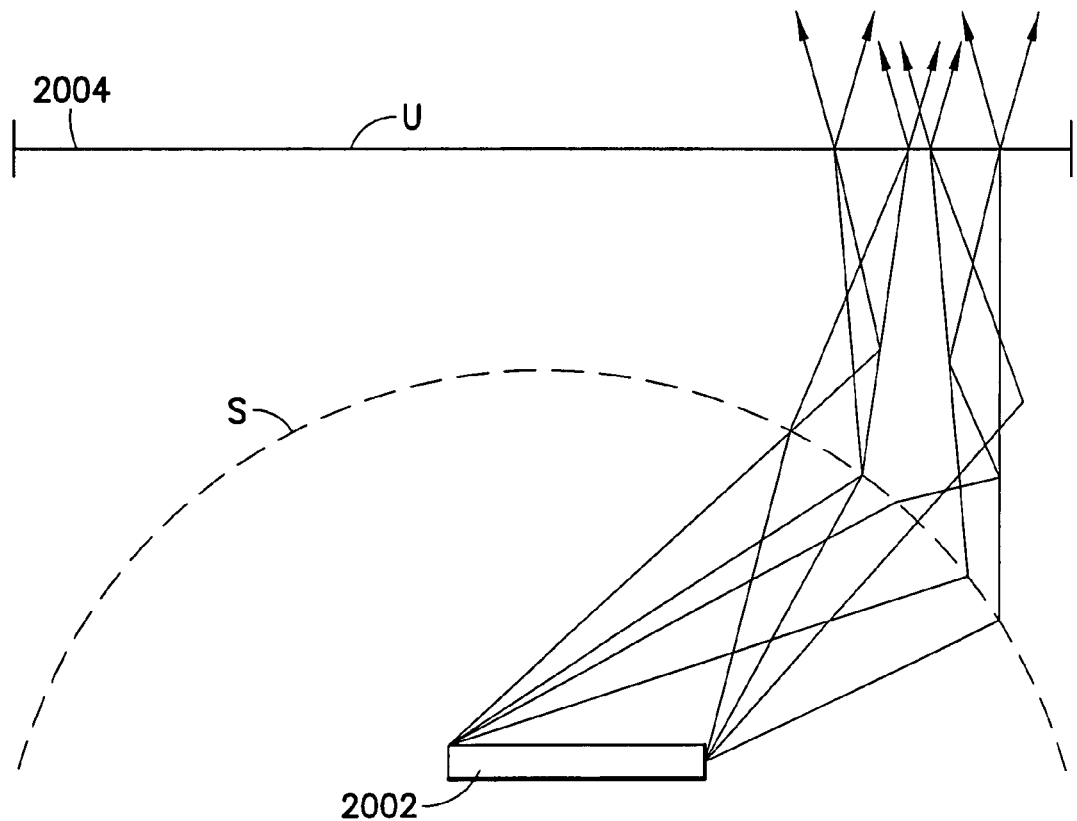
FIG. 21 illustrates raypaths according to an embodiment of the invention.

The imaging channels presented above provide real solution for that problem. There is no need to guide all the rays with the same optical surfaces. The continuous flow of rays is divided to several cylindrically symmetric "channels" at some surface S. (approximately hemisphere which was described above, it can also differ from the hemisphere depending on the optimization of the design). Each channel can now be designed separately so that the rays are transferred to the needed location and directions and the optical system can now be different for different vertical angles (theta) above the source. That gives much more degrees of freedom to the design and allows the use of above described channels of the invention, which do the desired transformation. The beams from the channels are then combined on the surface U to a one solid beam of light. In order to preserve the etendue of the beam, the entrance pupils and the exit pupils of the 2D-optical system of every channel radial cross-section plane need to form continuous surfaces. In addition to that the directions of the output beams from the channels need to be adjusted so that the angular distribution is also smooth over the whole output plane of the illuminator. FIG. 21 shows schematically exemplary raypaths implemented by the channels.

While exemplary optical channels and combinations have been shown and described, the invention is not limited only to those embodiments detailed herein.

We claim:

1. An apparatus comprising:
    at least one ray guide substantially cylindrically symmetrical about an axis;
    said at least one ray guide being arranged to substantially image at least a portion of the rays, which emanate from a non-point object towards an entrance pupil of the said at least one ray guide, to an image;
    and in each individual cross-sectional plane which includes the said axis and a portion of the entrance pupil, said at least one ray guide being arranged to image an individual subset of the rays which emanate from the non-point object along the individual cross-sectional plane towards a portion of the entrance pupil which is on the individual cross-sectional plane and on one side of the axis to an intermediate image on the individual cross-sectional plane, and to further substantially image the at least a portion of the rays from the intermediate image to an cross-sectional image on the cross-sectional plane, which cross-sectional image substantially coincides with a cross-section of the image at the said individual cross-sectional plane, such that no two said intermediate images of two different individual cross-sectional planes cross each other.

2. An apparatus of claim 1, wherein said at least one ray guide is arranged such that no ray of the individual subset of rays crosses the axis between the said cross-section of the entrance pupil and the cross-section of the exit pupil of the said at least one ray guiding component which is on the same half of the individual cross-sectional plane in respect to the axis than the said cross-section of the entrance pupil.

3. The apparatus of claim 1, wherein the at least one ray guide is arranged to substantially image the entrance pupil to the exit pupil on each of the cross-sectional half planes bounded by the axis.

4. The apparatus of claim 1, wherein said at least one ray guide is arranged to substantially image substantially all rays, which emanate from the non-point object towards the entrance pupil of the said at least one ray guide, to the image.

5. The apparatus of claim 1, wherein said at least one ray guide is arranged such that conjugate points in the entrance pupil and in the exit pupil are spaced from the axis by a substantially equal distance.

6. The apparatus of claim 1, wherein said at least one ray guide is arranged such that any point which is substantially imaged from the non-point object to the image forms a spot on the image such that its root mean square-spot size is substantially smaller than a mean diameter of the image.

7. The apparatus of claim 6, wherein the root mean square-spot size is smaller than one fourth of the mean diameter of the image.

8. The apparatus of claim 1, wherein said at least one ray guide is arranged such that an average distance from the non-point object to the entrance pupil is substantially larger than a mean distance from the non-point object to the axis.

9. The apparatus of claim 8; wherein said average distance from the non-point object to the entrance pupil is at least three times larger than the mean distance from the non-point object to the axis.

10. The apparatus of claim 1, wherein the rays are rays of electromagnetic radiation between ultraviolet and infrared wavelengths.

11. The apparatus of claim 10, wherein the rays of electromagnetic radiation are rays emitted from a light-emitting diode.

12. The apparatus of claim 1, which is an illumination component of an image forming system.

13. The apparatus of claim 1, wherein said at least one ray guide is arranged such that at least one line between the entrance pupil and a point on the axis, which point is nearest to an average point of the non-point object, forms an angle greater than 35 degrees with the axis.

14. The apparatus of claim 1, wherein said at least one ray guide is arranged such that every line between the entrance pupil and a point on the axis, which point is nearest to an average point of the non-point object, forms an angle greater than 30 degrees with the axis.

15. The apparatus of claim 1, wherein said at least one ray guide is arranged to change the propagation direction of the at least portion of the rays successively at least in three distinct locations per ray.

16. The apparatus of claim 1, wherein said at least one ray guide is arranged to change the propagation direction of the at least portion of the rays successively at no more than five distinct locations per ray.

17. The apparatus of claim 1, wherein said at least one ray guide is arranged such that the entrance pupil covers a solid angle of at least 0.1 steradians about a point on the axis which is nearest to an average point of the non-point object.

18. An apparatus comprising:
    at least one ray guiding component substantially cylindrically symmetrical about an axis of revolution;
    said at least one ray guiding component being arranged to substantially image at least a portion of the rays, which emanate from a non-point object towards an entrance pupil of the said at least one ray guiding component, to an image;

said at least one ray guiding component being arranged to substantially image the entrance pupil into an exit pupil of the said at least one ray guiding component, such that each point on the entrance pupil is substantially imaged to a projection of the point substantially along the direction of the said axis of revolution on the exit pupil;

said at least one ray guiding component being arranged to have substantially all points of the entrance pupil at approximately a same distance from the object; and said at least one ray guiding component being arranged so that no path of any meridional ray imaged from the entrance pupil into the exit pupil crosses the said axis of revolution between the entrance pupil and the exit pupil.

19. The apparatus of claim 18, wherein said at least one ray guiding component is arranged to substantially image substantially all rays, which emanate from the non-point object towards the entrance pupil of the said at least one ray guiding component, to the image.

20. The apparatus of claim 18, wherein said at least one ray guiding component is arranged such that any point which is substantially imaged from the non-point object to the image forms a spot on the image such that its root mean square-spot size is substantially smaller than a mean diameter of the image.

21. The apparatus of claim 18, wherein the root mean square-spot size is smaller than one fourth of a mean diameter of the image.

22. The apparatus of claim 18, wherein said at least one ray guiding component is arranged such that an average distance from the non-point object to the entrance pupil is substantially larger than a mean distance from the object to the axis.

23. The apparatus of claim 22; wherein said average distance from the non-point object to the entrance pupil is at least three times larger than the mean distance from the non-point object to the axis.

24. The apparatus of claim 18, wherein the rays are rays of electromagnetic radiation between ultraviolet and infrared wavelengths.

25. The apparatus of claim 24, wherein the rays of electromagnetic radiation are rays emitted from a light-emitting diode.

26. The apparatus of claim 18, which is an illumination component of an image forming system.

27. The apparatus of claim 18, wherein said at least one ray guiding component is arranged such that at least one line between the entrance pupil and the point on the axis, which point is nearest to an average point of the non-point object, forms an angle greater than 35 degrees with the axis.

28. The apparatus of claim 18, wherein said at least one ray guiding component is arranged such that every line between the entrance pupil and a point on the axis, which point is nearest to an average point of the non-point object, forms an angle greater than 30 degrees with the axis.

29. The apparatus of claim 18, wherein said at least one ray guiding component is arranged to change the propagation direction of the at least portion of the rays successively at no more than five distinct locations per ray.

30. The apparatus of claim 18, wherein said at least one ray guiding component is arranged to have length along the axis smaller than a diameter of the exit pupil.

31. The apparatus of claim 18, wherein said at least one ray guiding component is arranged such that the entrance pupil covers a solid angle of at least 3 steradians about a point on the axis, which point is nearest to an average point of the non-point object.

* * * * *